(12) United States Patent
Bronk

(10) Patent No.: US 10,957,190 B2
(45) Date of Patent: Mar. 23, 2021

(54) TRAFFIC MANAGEMENT SYSTEM, COMPONENTS OF A DISTRIBUTED TRAFFIC MANAGEMENT SYSTEM, PRIORITIZATION/LOAD-DISTRIBUTION SYSTEM, AND METHODS THEREOF

(71) Applicant: Intel Corporation, Santa Clara, CA (US)

(72) Inventor: Mateusz Bronk, Gdansk (PL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/021,027

(22) Filed: Jun. 28, 2018

(65) Prior Publication Data

US 2019/0051166 A1 Feb. 14, 2019

(51) Int. Cl.
| | | |
|---|---|---|
| *G08G 1/08* | (2006.01) | |
| *G08G 1/01* | (2006.01) | |
| *G08G 1/0965* | (2006.01) | |
| *H04W 4/021* | (2018.01) | |
| *H04L 29/06* | (2006.01) | |
| *H04W 4/40* | (2018.01) | |

(Continued)

(52) U.S. Cl.
CPC .............. *G08G 1/08* (2013.01); *G08G 1/0116* (2013.01); *G08G 1/0145* (2013.01); *G08G 1/0965* (2013.01); *G08G 1/096716* (2013.01); *G08G 1/096741* (2013.01); *G08G 1/096783* (2013.01); *H04L 63/0807* (2013.01); *H04W 4/021* (2013.01); *H04W 4/40* (2018.02); *H04W 12/06* (2013.01)

(58) Field of Classification Search
CPC ...... G08G 1/08; G08G 1/0116; G08G 1/0145; G08G 1/166; G08G 1/0965; G08G 1/01; H04W 4/42; H04W 4/48; H04W 12/02; H04W 12/08; H04W 4/40; H04W 4/021; H04W 4/024; H04W 12/00; H04W 12/002; H04W 12/004; H04L 63/0807; H04L 63/105; H04L 63/104
See application file for complete search history.

(56) References Cited

U.S. PATENT DOCUMENTS

| | | | | |
|---|---|---|---|---|
| 5,777,564 | A * | 7/1998 | Jones ....................... | G08G 1/08 340/907 |
| 7,557,696 | B2 * | 7/2009 | Brinton .................... | G08G 1/20 340/439 |
| 10,192,434 | B1 * | 1/2019 | Gaither ..................... | G08G 1/07 |

(Continued)

*Primary Examiner* — Hoi C Lau
(74) *Attorney, Agent, or Firm* — Viering, Jentschura & Partner MBB

(57) ABSTRACT

Various aspects are related to a traffic management system that may include: a token issuer associated with a first traffic-managing infrastructure, a token collector associated with a vehicle, and a token verifier associated with a second traffic-managing infrastructure, wherein the token issuer is configured to issue one or more tokens, wherein the token collector is configured to collect the one or more tokens when the vehicle is in a vicinity of the first traffic-managing infrastructure and send the one or more collected tokens to the token verifier when the vehicle is in a vicinity of the second traffic-managing infrastructure, wherein the token verifier is configured to trigger a control of the second traffic-managing infrastructure based on the one or more collected tokens.

19 Claims, 11 Drawing Sheets

(51) Int. Cl.
*G08G 1/0967* (2006.01)
*H04W 12/06* (2021.01)

(56) References Cited

U.S. PATENT DOCUMENTS

| | | | | |
|---|---|---|---|---|
| 2007/0008174 | A1* | 1/2007 | Schwartz | G08G 1/087 340/902 |
| 2008/0187318 | A1* | 8/2008 | Osanai | H04B 10/116 398/129 |
| 2009/0027191 | A1* | 1/2009 | Farah | H04W 4/029 340/539.13 |
| 2011/0090094 | A1* | 4/2011 | Yamada | G08G 1/095 340/905 |
| 2011/0254701 | A1* | 10/2011 | Yamada | G08G 1/095 340/905 |
| 2013/0214902 | A1* | 8/2013 | Pineau | H04W 4/90 340/5.61 |
| 2013/0311038 | A1* | 11/2013 | Kim | G08G 1/0962 701/36 |
| 2014/0002236 | A1* | 1/2014 | Pineau | G06F 21/32 340/5.6 |
| 2014/0046581 | A1* | 2/2014 | Ota | G08G 1/096716 701/408 |
| 2014/0320316 | A1* | 10/2014 | Peri | G08G 1/083 340/907 |
| 2015/0154851 | A1* | 6/2015 | Vincent | G06F 16/9537 340/539.13 |
| 2016/0039420 | A1* | 2/2016 | Tosaka | B60W 30/18054 701/36 |
| 2016/0258777 | A1* | 9/2016 | Bodake | G01C 21/367 |
| 2016/0377709 | A1* | 12/2016 | Wang | G01S 11/10 342/454 |
| 2016/0379212 | A1 | 12/2016 | Bowman et al. | |
| 2017/0018179 | A1* | 1/2017 | Gutierrez | G08G 1/096725 |
| 2017/0034667 | A1* | 2/2017 | Kumabe | G06F 21/305 |
| 2017/0131719 | A1* | 5/2017 | Micks | G08G 1/166 |
| 2017/0249836 | A1* | 8/2017 | Laur | G08G 1/0137 |
| 2017/0256167 | A1* | 9/2017 | Kim | G08G 1/166 |
| 2017/0287331 | A1* | 10/2017 | Laur | G08G 1/096725 |
| 2017/0305335 | A1* | 10/2017 | Wei | B60Q 1/50 |
| 2017/0347367 | A1* | 11/2017 | Tandai | H04W 4/70 |
| 2017/0352263 | A1* | 12/2017 | Umehara | G08G 1/0133 |
| 2018/0079421 | A1* | 3/2018 | Chen | G08G 1/0962 |
| 2018/0149491 | A1* | 5/2018 | Tayama | G06K 9/00805 |
| 2018/0198865 | A1* | 7/2018 | Kurihara | H04W 88/02 |
| 2018/0240026 | A1* | 8/2018 | Pietrobon | G06N 20/00 |
| 2018/0255562 | A1* | 9/2018 | Cho | H04W 4/48 |
| 2018/0315306 | A1* | 11/2018 | Kelly | G08G 1/083 |
| 2018/0330617 | A1* | 11/2018 | Wei | B60K 31/0008 |
| 2018/0357912 | A1* | 12/2018 | Kessler | G08G 7/00 |
| 2019/0018419 | A1* | 1/2019 | Lee | G08G 1/096791 |
| 2019/0051166 | A1* | 2/2019 | Bronk | G08G 1/08 |
| 2019/0088148 | A1* | 3/2019 | Jacobus | B60W 10/20 |
| 2019/0106100 | A1* | 4/2019 | Hoskins | H04W 4/46 |
| 2019/0180617 | A1* | 6/2019 | Hori | G08G 1/0141 |
| 2019/0215378 | A1* | 7/2019 | Munishwar | H04W 4/029 |
| 2019/0287396 | A1* | 9/2019 | Sayin | G08G 1/096783 |
| 2019/0389482 | A1* | 12/2019 | Michalakis | G05D 1/0088 |

\* cited by examiner

FIG. 6
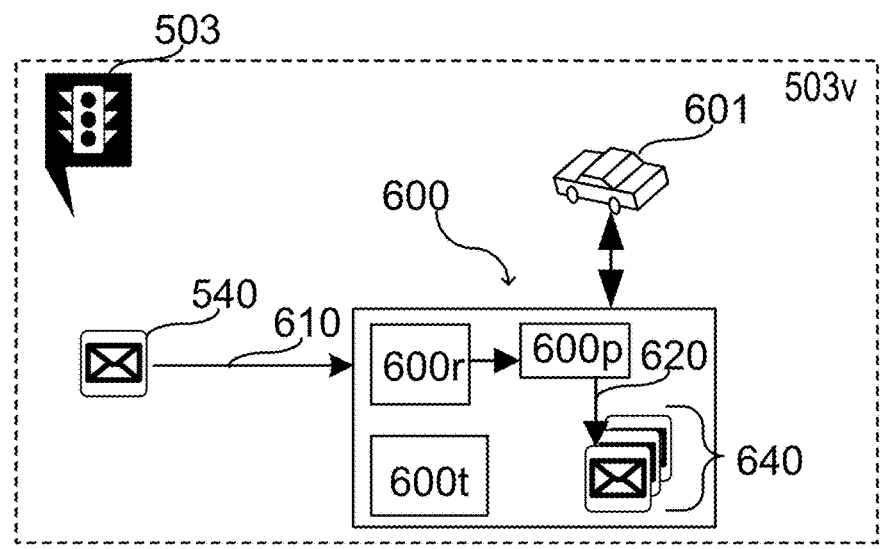
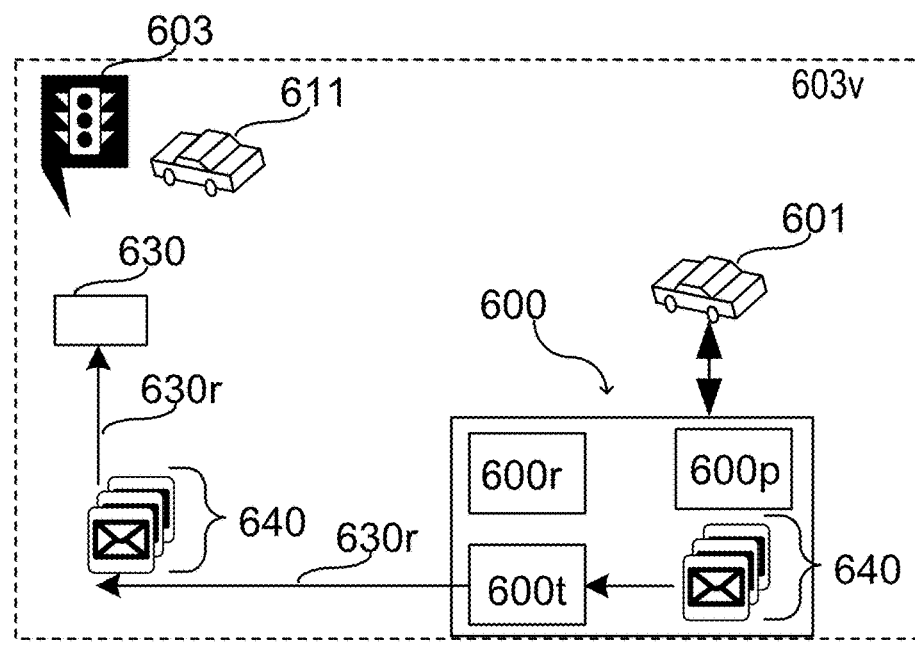

TRAFFIC MANAGEMENT SYSTEM, COMPONENTS OF A DISTRIBUTED TRAFFIC MANAGEMENT SYSTEM, PRIORITIZATION/LOAD-DISTRIBUTION SYSTEM, AND METHODS THEREOF

TECHNICAL FIELD

Various aspects relate generally to a traffic management system, components of a distributed traffic management system, as, for example, a token issuer, a token collector, and a token verifier, a prioritization/load-distribution system, and methods, e.g. methods for managing a vehicle in traffic.

BACKGROUND

In general, well-established solutions for traffic management may include traffic lights at intersection, gateways, overpasses, etc. Further, in highly congested areas or major cities Intelligent Transportation Systems (ITS) and/or centralized Traffic Management Systems (TMS) may be utilized to manage the vehicle flow. Those systems may be implemented to optimize the vehicle flow based on one or more criteria. As an example, a queue length at an intersection may be determined to optimize the traffic flow at the intersection. As another example, a priority function may be implemented to give preference to public transportation, emergency services, etc. The TMS systems may also require a central control center for operating efficiently and achieve global optimizations. Further, other detection systems may be related to traffic in cities, at overpasses, on highways, etc. Those systems may be implemented to collect tolls, or any other fees, e.g. parking fees.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 6 shows a token collector in a schematic view, according to some aspects;

DESCRIPTION

Figure 1:
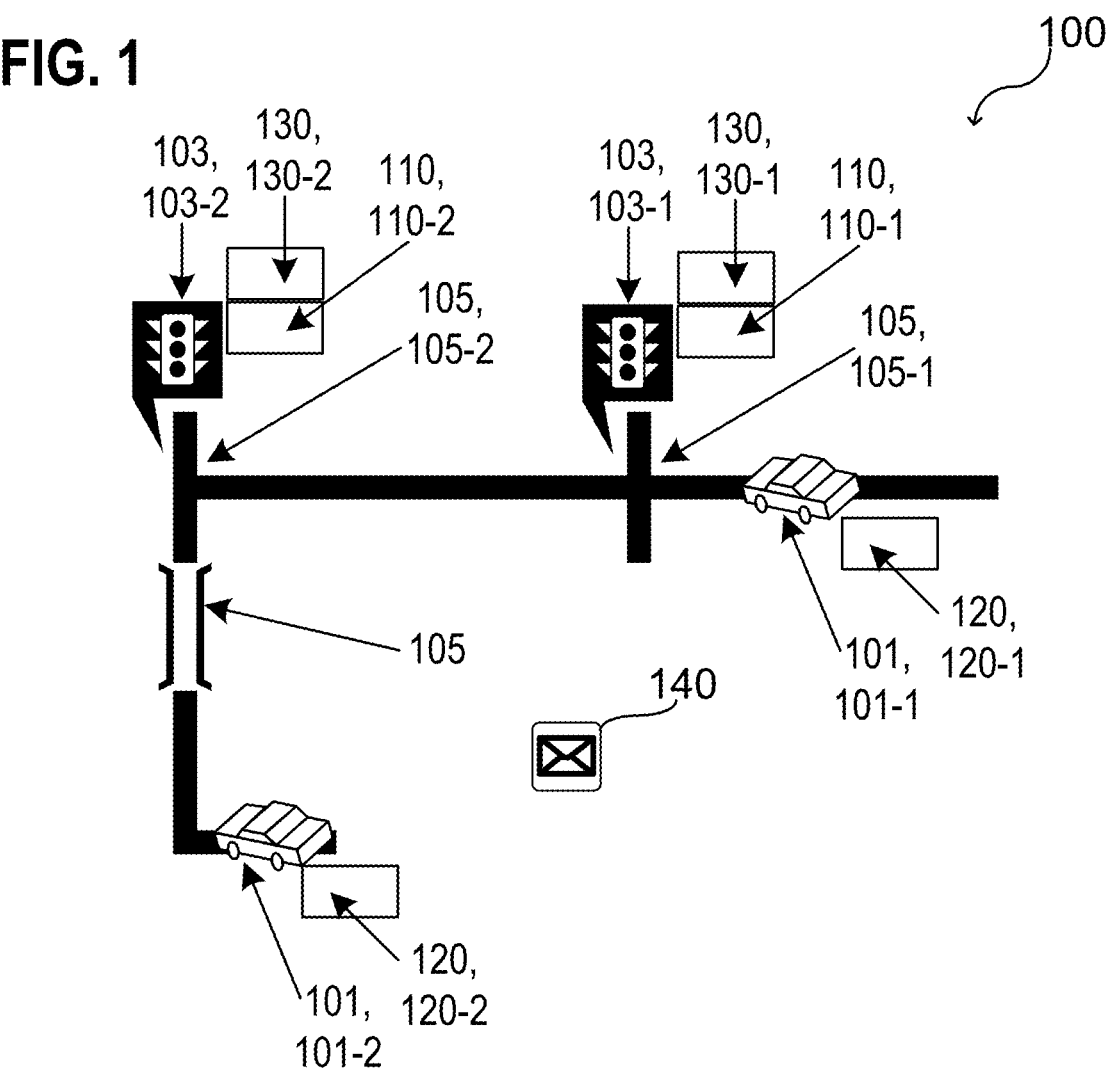
FIG. 1 shows an exemplary traffic management system in a schematic view, according to some aspects.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g., "a plurality of [objects]," "multiple [objects]") referring to a quantity of objects expressly refers more than one of the said objects. The terms "group (of)," "set [of]," "collection (of)," "series (of)," "sequence (of)," "grouping (of)," etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The terms "processor" as, for example, used herein may be understood as any kind of entity that allows handling data. The data may be handled according to one or more specific functions executed by the processor. Further, a processor as used herein may be understood as any kind of circuit, e.g., any kind of analog or digital circuit. The term "handle" or "handling" as for example used herein referring to data handling, file handling or request handling may be understood as any kind of operation, e.g., an I/O operation, and/or any kind of logic operation. An I/O operation may include, for example, storing (also referred to as writing) and reading.

A processor may thus be or include an analog circuit, digital circuit, mixed-signal circuit, logic circuit, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Differences between software and hardware implemented data handling may blur. A processor, controller, and/or circuit detailed herein may be implemented in software, hardware and/or as hybrid implementation including software and hardware. In some aspects, any method described herein may be partially or completely implemented as a non-transitory computer readable medium with program instructions, which when executed, cause one or more processors to perform at least a portion or all of the method.

The term "system" (e.g., a computing system, a memory system, a storage system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

As used herein, the term "memory", "memory device", and the like may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa.

The term "vehicle" as used herein may be understood as any suitable type of vehicle, e.g., a motor vehicle also referred to as automotive vehicle. As an example, a vehicle may be a car also referred to as a motor car, a passenger car, etc. As another example, a vehicle may be a truck (also referred to as motor truck), a van, etc. The term "distance from ground" as used herein may be also referred to as height above ground, above ground level, etc. In some aspects, the term "ground" as used herein may be understood as any type of solid infrastructure, e.g. a street, etc., below the respective obstacle. The term "lane" or "driving lane" as used herein may be understood as any type of solid infrastructure (or section thereof) on which a vehicle may drive.

The term "traffic infrastructure" as used herein may be understood as any type of structure occurring in road traffic that may be configured to influence the road traffic. As an example, a traffic infrastructure may include a traffic light, a traffic sign, a gateway, a railroad crossing, a drawbridge, a construction site, a heavy goods transport, etc.

In the following, a decentralized traffic management system is illustrated and described exemplarily with reference to a vehicle. However, the decentralized traffic management system described herein may be implemented to manage any other type of traffic in a similar way. Various aspects are described herein with reference to road traffic and vehicles; however, the term traffic may alternatively include data traffic in a network and managing network packet flow (QoS). Further, the traffic may include tasks flow in a shared compute system and a prioritization of the tasks (e.g. CPU time management). Further, in a similar way, people/goods flow may be managed based on distributing tokens, collecting tokens, and verifying tokens (e.g. in related to delivery services, managing containers at a terminal, etc.).

Various aspects are described herein with reference to a motor vehicle; however, other types of vehicles may be provided including the same or similar structures and functions as described exemplarily for the motor vehicle. Various aspects are described herein with reference to a traffic light; however, other types of traffic infrastructures may be provided including the same or similar structures and functions as described exemplarily for the traffic light.

With the advent of autonomous vehicles and ubiquitous wireless connectivity, the traffic management problems may require new solutions to improve commute efficiency. This is especially important because Level5 autonomous vehicles may not just replace current human-driven cars in an instant but the two may co-exist for a while, which means that the well-known red-yellow-green traffic lights are not going away soon.

Currently implemented traffic management systems seem to be not globally fair. As an example, depending on the specific route, some users might end up having their travel time increased by for example 10% and some other users might end up having their travel time increased by for example by 80% due to the traffic management. In some aspects, it is attempted to solve the fairness problem by providing a suitable traffic management system. This "fair" traffic management system may be called upon to influence the time that is spent by a vehicle waiting in front of a traffic light, etc., (e.g. waiting in a queue) during the whole travel. Further, the traffic management system described herein may not require a central coordination point to operate.

Currently used Intelligent Transportation Systems (ITS) or Advanced Traffic Management Systems (TMS) may rely on real-time data from road-mounted sensing technologies (e.g. video cameras, inductive loops, etc.), optionally assisted by user-provided input (e.g. GPS readings from an in-vehicle-entertainment unit, etc.) in order to detect congestion at intersections and make decisions on which light to display on each signal of the traffic light. However, those systems may not have any knowledge of vehicle's planned destination or the time (more specifically: accumulated delay) that the travel associated with the vehicle took so far. Therefore, those factors may not be included in the currently used traffic management.

While vehicle re-identification (i.e. nameplate recognition, RFID, E-ZPass) systems may be implemented, they may be not ubiquitous enough to recreate a vehicle's complete route, and may require connectivity between participating "gates". Therefore, currently used vehicle identification and/or re-identification systems may be typically used for travel-time calculations between select "gates" and/or and traffic jam detection. This in turn means that, while such systems may be able to optimize the flow by a traffic direction, they may fail to provide percentage-wise equal delays to each commuter. Because today's ITS systems may be highly networked and may form master-slave architectures (e.g. all traffic signals may be managed from a control center), they may require a robust and secure network connectivity, which is generally costly to implement, slowing down the adoption, etc. The contemporary systems may not allow handling of extreme conditions efficiently; and, therefore, may require manual intervention and/or human judgement of a traffic control authority (e.g. a police officer).

In contrast to currently used traffic management systems, the traffic management system provided herein may be configured as a decentralized system. In some aspects, systems and methods may be provided for calculating per-vehicle passage priority (e.g. a total time spent on a "red light") during a travel, by handing off anonymized, cryptographically-secured, platform, and location-bound tokens to each commuter at regular intervals.

This dataset or similar datasets may be used to make decisions about traffic priority at the edge (e.g. at an individual intersection) without the need for central coordination, achieving, if desired, global fairness between commuters, also driving deployment costs down. The deployment may not be limited to traffic lights, but may have wide applications in autonomous driving (i.e. give way/overtake decisions made by quorums of members).

In some aspects, one or more processors configured to carry out one or more traffic management operations may be embedded in a traffic infrastructure, e.g. in a traffic light, in a vehicle, etc.

In some aspects, trusted execution environment (TEE) technologies, for example CSME (Converged Security and Manageability Engine), SGX (Software Guard Extensions), ARM TrustZone, etc., as well as privacy-enhancing attestation protocols, for example EPID (Enhanced Privacy ID) or any other suitable remote attestation technology, for example DAA (Direct Anonymous Attestation may be provided for in-vehicle systems. However, various signature schemes or group signature schemes other than DAA may be used in a similar way.

Various aspects are related to collecting tokens, while, optionally, privacy-enhancing functions may be implemented prohibiting for example user (e.g., vehicle) tracking.

FIG. 1 illustrates a traffic management system 100, in a schematic view, according to various aspects. The traffic management system 100 may include one or more electronic devices 110, 120, 130 associated with one or more vehicles 101 and/or with one or more traffic-managing infrastructures 103. In some aspects, a traffic-managing infrastructure 103 may include a traffic light, etc. A traffic-managing infrastructure 103 or a set of traffic-managing infrastructures 103 may be associated with a traffic structure 105. The traffic structure 105 may include, for example, an intersection, a tunnel, a bridge, a construction site, etc. As an example, at least one first traffic-managing infrastructure 103-1 may be associated, for example, with at least one first traffic structure 105-1, and at least one second traffic-managing infrastructure 103-2 may be associated with at least one second traffic structure 105-2, and the like.

According to various embodiments, the respective traffic-managing infrastructure 103 may be a classic traffic light. The classic traffic light may be coupled with one of the first electronic devices 110. The traffic-managing infrastructure 103 may not be necessarily connected to any other ITS or TMS system; however, the traffic-managing infrastructure 103 may benefit from such connection if desired. In some aspects, the traffic-managing infrastructure 103 may be augmented with "smart" capabilities, i.e. by communicatively coupling one or more electronic devices with the traffic-managing infrastructure 103, wherein one or more electronic devices are configured to manage the one or more desired traffic management system functionalities.

According to various embodiments, the traffic management system 100 may include one or more first electronic devices, one or more second electronic devices, and one or more third electronic devices associated with functions of the traffic management system 100. The traffic management system 100 may be based on issuing, collecting, and/or verifying tokens. The tokens may be associated with a waiting time of corresponding vehicles 101 at one or more of the traffic-managing infrastructures 103, 103-1, 103-2 during travel. According to at least one of their functions, the first electronic device may be referred to as a token issuer 110, the second electronic device may be referred to as a token collector 120, 120-1, 120-2, and the third electronic device may be referred to as a token verifier 130, 130-1, 130-2. A token 140 representing a waiting time may be referred to as a wait-token.

As an example, a token issuer 110 may be associated with a corresponding traffic-managing infrastructure 103. As an example, a first token issuer 110-1 may be associated with a first traffic-managing infrastructure 103-1 and a second token issuer 110-2 may be associated with a second traffic-managing infrastructure 103-2, etc. The respective token issuer 110 may be integrated into the corresponding traffic-managing infrastructure 103 or may be disposed in an additional structure in a vicinity of the corresponding traffic-managing infrastructure 103.

The token issuer 110 may include one or more processors, one or more memories, one or more sensors, one or more emitters, and/or one or more receivers, etc. As an example, the token issuer 110 may include one or more IoT (Internet of Things) devices or any other computing device or computing system that allows implementation of the desired functions.

In some aspects, the token issuer 110 may be configured to carry out one or more operations associated with the functionalities of the traffic management system 100 described herein.

Figure 2A:
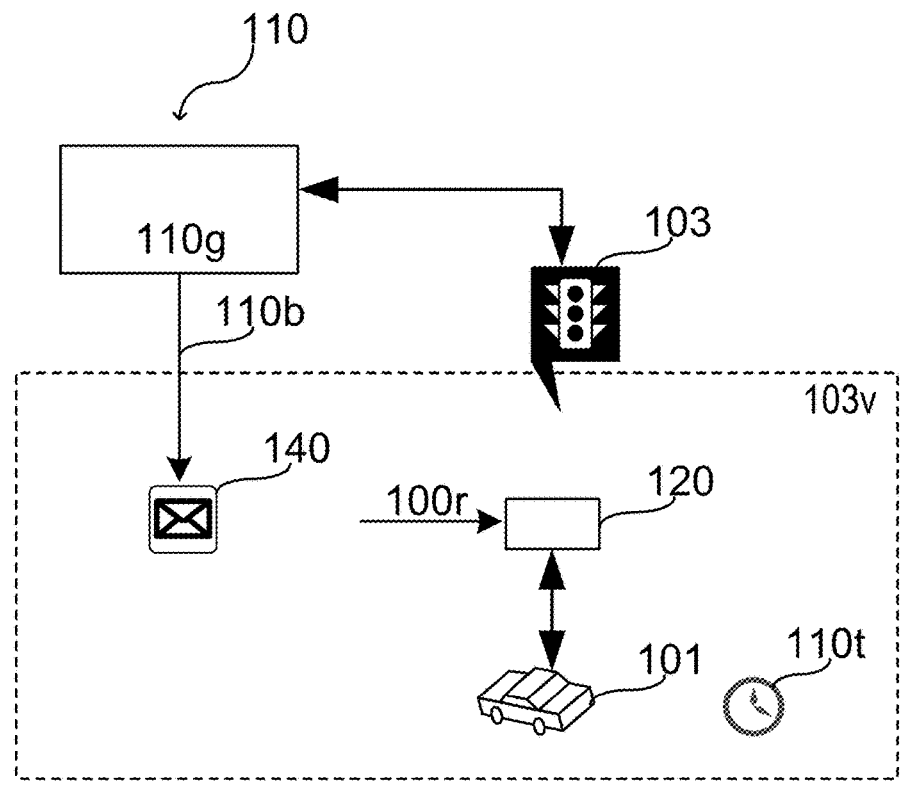
FIGS. 2A to 2C show exemplarily various components that may be part of a traffic management system in a schematic view, according to some aspects.

FIG. 2A shows a token issuer 110 in a schematic view, according to various aspects. The token issuer 110 may be configured to provide the functionality of issuing one or more tokens 140. In other words, the traffic management system 100 may include a token issuer 110 associated with at least one traffic-managing infrastructure 103, wherein the token issuer 110 may be configured to carry out a token issue operation at a pre-defined time interval. The token issue operation may include generating 110g a token 140 that represents a waiting time 110t of one or more vehicles 101 in a vicinity 103v of the at least one traffic-managing infrastructure 103 and beaming 110b the generate token 140. This allows, for example, a reception 100r of the generated and beamed token 140 by one or more tokens collectors 120 associated with the one or more vehicles 101 in the vicinity 103v of the traffic-managing infrastructure 103. In some aspects, beaming 110b a token 140 may include to transmit (e.g. via a data signal) the token 140. In some aspects, the token 140 may be transmitted into a particular direction.

As exemplarily shown in FIG. 1, a token collector 120 may be associated with a corresponding vehicle 101. As an example, a first token collector 120-1 may be associated with a first vehicle 101-1 and a second token collector 120-2 may be associated with a second vehicle 101-2, etc. The respective token collector 120 may be integrated into the corresponding vehicle 101. The token collector 120 may include one or more processors, one or more memories, one or more sensors, one or more emitters, and/or one or more receivers, etc. As an example, the token collector 120 may include one or more IoT (Internet of Things) devices or any other computing device or computing system that allows implementation of the desired functions. As an example, the token collector 120 may be configured to provide the functionality of collecting token and transmitting collected token 140 to a token verifier 130.

Figure 2B:
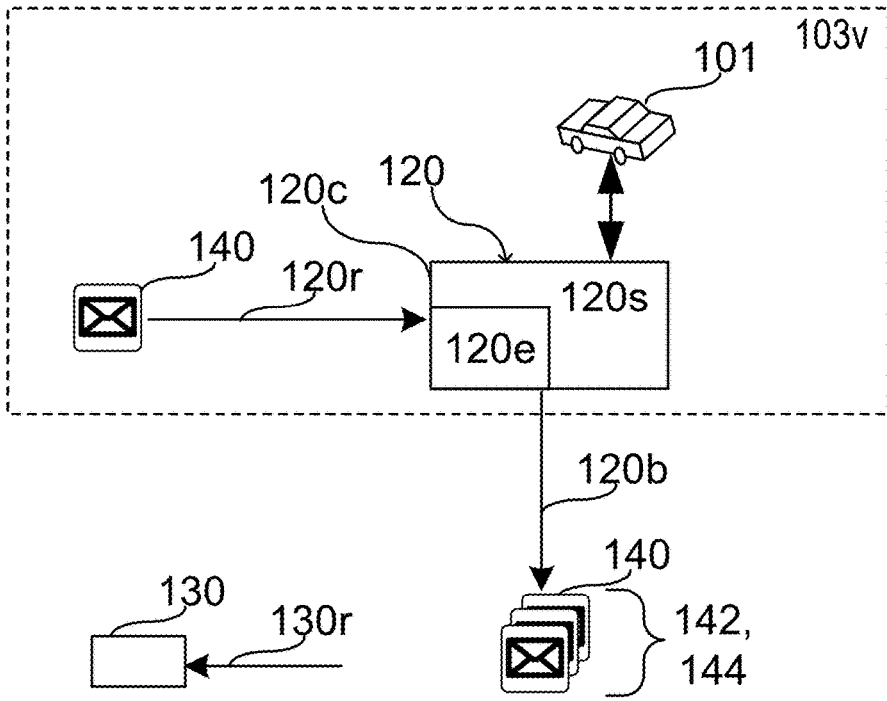

FIG. 2B shows a token collector 120 in a schematic view, according to various aspects. In some aspects, the token collector 120 may be configured to carry out one or more operations associated with the functionalities of the traffic management system 100 described herein. In other words, a traffic management system 100 may include a token collector 120 associated with a vehicle 101. The token collector 120 may be configured to collect 120c one or more tokens 140. The one or more tokens 140 may be associated with a travel of the vehicle 101. Each of the one or more collected token 140 may represent a waiting time 110t of the vehicle 101 in a respective vicinity 103v of one or more traffic infrastructures 103 (see FIG. 1 and FIG. 2A).

As an example, when a vehicle 101 is in a vicinity of a first traffic-managing infrastructure 103-1, a token collector 120 associated with the vehicle 101 may collect one or more tokens 140 issued by a first token issuer 110-1 associated with the first traffic-managing infrastructure 103-1 and when the vehicle 101 is in a vicinity of a second traffic-managing infrastructure 103-2, the token collector 120 may collect one or more tokens 140 issued by a second token issuer 110-2 associated with the second traffic-managing infrastructure 103-2, etc. As an example, the collected token 140 may represent a total waiting time of the vehicle at one or more traffic-managing infrastructures 103 during travel. According to various embodiments, collecting a token 140 may include receiving 120r issued tokens 140 and storing 120s the received token 140s.

Further, the token collector 120 may be configured to beam 120b the one or more collected wait tokens 140 (e.g. a set 142 including all of the collected tokens 140) to allow a reception 130r of the one or more beamed token 140 by a token verifier 130.

In some aspects, the token collector 120 may include a trusted execution environment 120e. In this case, the token collector 120 may be configured to generate token data 144 based on the one or more received tokens and to beam the token data 144. The token data may represent a total waiting time of the vehicle 101 at one or more traffic-managing infrastructures 103 during travel. In some aspects, compared to the token 140 itself, the token data 144 may have an enhanced privacy.

As exemplarily shown in FIG. 1, a token verifier 130 may be associated with a corresponding traffic-managing infrastructure 103. As an example, a first token verifier 130-1 may be associated with a first traffic-managing infrastructure 103-1 and a second token verifier 130-2 may be associated with a second traffic-managing infrastructure 103-2, etc. The respective token verifier 130 may be integrated into the corresponding traffic-managing infrastructure 103 or may be disposed in an additional structure in a vicinity of the corresponding traffic-managing infrastructure 103. The token verifier 130 may include one or more processors, one or more memories, one or more sensors, one or more emitters, and/or one or more receivers, etc. As an example, the token verifier 130 may include one or more IoT (Internet of Things) devices or any other computing device or computing system that allows implementing the desired functions. As an example, the token verifier 130 may be configured to provide the functionality of verifying token 140 or token data 144 and trigger a control of a traffic-managing infrastructure 103 based on the token 140 or token data 144 after verification.

Based on the verification of the previously issued token 140 or the data 144 representing the previously issued token 140, a traffic-managing infrastructure 103 that the vehicle may approach may be controlled by any suitable controller that is communicatively coupled with the token verifier 130 or by the token verifier 130 itself.

Figure 2C:
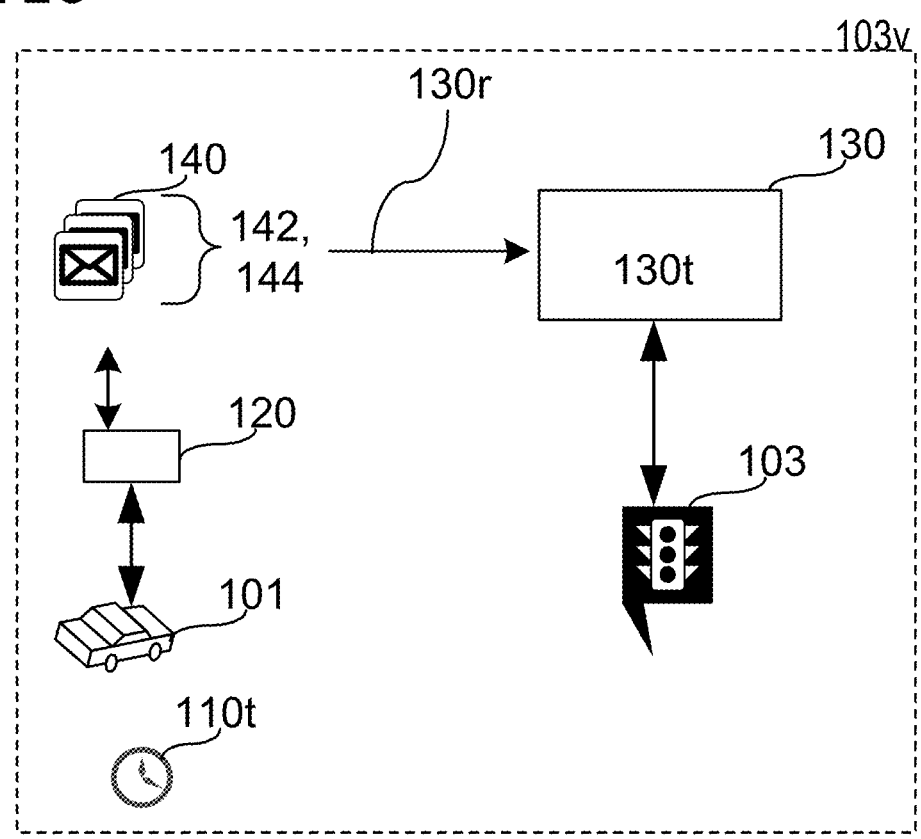

FIG. 2C shows a token verifier 130 in a schematic view, according to various aspects. In some aspects, the token verifier 130 may be configured to carry out one or more operations associated with the functionalities of the traffic management system 100 described herein. In other words, a traffic management system 100 may include a token verifier 130 corresponding to a traffic infrastructure 103. The token verifier 130 may be configured to receive 130r at least one of one or more tokens 140 or token data 144 representing one or more wait tokens 140 from a token collector 120 associated with a vehicle 101. Each of the one or more tokens 140 may represent a waiting time 110t of the vehicle 101 in a respective vicinity 103v of one or more traffic infrastructures 103. Further, the token verifier 130 may be configured to trigger 130t a control of the corresponding traffic-managing infrastructure 103 based one at least one of the received one or more tokens 140 or the received data 144 representing one or more tokens 140.

According to various aspects, the previously issued token 140 that may be collected by a token collector 120 of a vehicle 101 may not be necessarily issued by the same traffic-managing infrastructure 103 as controlled by the token verifier 130. As an example, each of a plurality of traffic-managing infrastructures 103 may be associated with a corresponding token issuer 110. However, the respective traffic-managing infrastructures 103 may be located at different locations, e.g. a first traffic-managing infrastructure 103-1 may be located at a first intersection, a second traffic-managing infrastructure 103-2 may be located at a second intersection, and so on. Accordingly, one or more tokens 140 may be issued at the first traffic-managing infrastructure 103-1, one or more tokens 140 may be issued at the second traffic-managing infrastructure 103-2, and so on. Illustratively, a vehicle 101 may be configured to allow a collection of the issued wait tokens 140 on a travel and may be prioritized or not by the respective traffic-managing infrastructures 103 based on the number of collected token 140 or any other suitable representative thereof.

Figure 3:
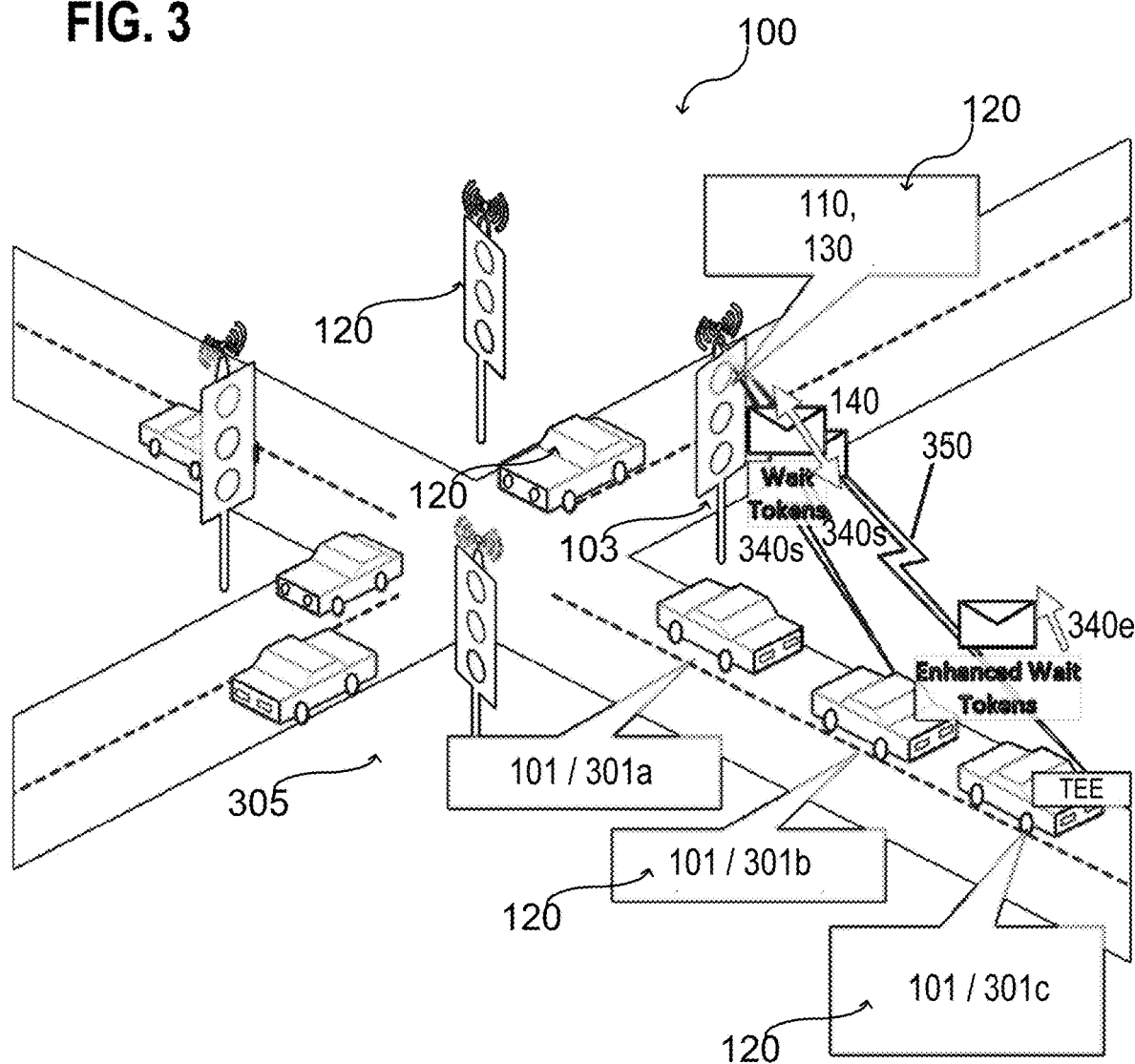
FIG. 3 shows a traffic management at an intersection in a schematic view, according to some aspects.

FIG. 3 shows a traffic management system 100 at an intersection 305 in a schematic view, according to various embodiments. According to various aspects, one or more tokens 140 may be periodically issued by a token issuer 110 associated with a traffic-managing infrastructure 103. The tokens 140 may be beamed by the token issuer 110 and received by any suitable receiver (e.g. by any token collector 120) in a physical proximity (e.g. in a range of 0 m to 50 m) of the corresponding traffic-managing infrastructure 103. In some aspects, accumulated simple tokens or a single enhanced token may be transmitted from one or more tokens collector 120 associated with the vehicles 101 (e.g. waiting in a queue) to a token verifier 130 associated with the traffic-managing infrastructure 103 in order to determine, for example, which traffic direction of the intersection 305 should receive priority.

According to various aspects, one or more directional antennas may be used to assign tokens into pools per-traffic direction. Alternatively or additionally, one or more location tags included in the tokens themselves may be used to assign tokens into pools per-traffic direction. The tokens may be checked for validity (e.g. based on a signature, and, optionally, revocation checking), freshness (e.g. based on an expiry time) and in case of simple tokens—for generation origin (e.g. based on geo fencing) and/or binding to a vehicle (i.e. is the 'proving' vehicle in vicinity).

According to some aspects, a token issuer 110 may be integrated into any vehicle 101 that might influence the traffic flow (e.g. to consider a waiting time of a vehicle since it may give passage to an emergency vehicle, etc.). Further, a token verifier 130 may be integrated into vehicles 301 to allow prioritization of one vehicle 101 compared to another vehicle given that both vehicles have a token collector 120. As an example, a first vehicle may have a greater number of collected tokens than a second vehicle and, based on a comparison of the number of collected tokens, the first may be prioritized by the second vehicle, e.g. the second vehicle may, for example, stop and give way to the first vehicle.

Various aspects are relates to tokens. The term "token" as used herein may be understood, for example, as a data structure issued by a token issuer in accordance with a traffic-managing infrastructure (e.g. with a traffic light). The token may be issued substantially periodically and captured (e.g. for later use) by vehicles in a vicinity of the respective traffic-managing infrastructure associated with the token issuer. The token may include a proof of wait time that may be bound to exact time, a location, and/or the concrete physical vehicle doing the wait.

In some aspects, at least two different types of tokens may be provided based on the level of trust placed in the vehicle. A first type is referred to herein as a simple token 340s and a second type is referred to herein as an enhanced token 340e. According to various aspects, the simple token 340s may be beamed by the respective token issuer 110 substantially periodically (e.g. every 30 seconds, e.g. in a time interval in the range from about 1 s to about 60 s) to all vehicles 101 in physical proximity using, for example, a unidirectional broadcast channel. In this case, every device may receive the same simple token 340s. The simple token 340s may include a unique identifier of the traffic-managing infrastructure 103 that issues the simple token 340s. As an example, the geo coordinates of the traffic-managing infrastructure 103 may be used as a unique identifier. Further, the simple token 340s may include a timestamp, e.g. the time of issuance. Further, the simple token 340s may include a digital signature proving its authenticity.

In order to bind the token to a concrete vehicle 101 (e.g. to prevent transfer from a vehicle actually receiving the token to another vehicle), the simple token 340s may include data representing vehicle IDs for which the simple token 340s may be valid. The vehicle IDs may be determined, for example, based on the respective nameplates that may be determined by one or more cameras. The one or more cameras may be associated with the traffic-managing infrastructure 103 and/or the corresponding token issuer 110. The one or more cameras may be mounted, for example, to a traffic light, etc.

In the case that the vehicle is a trusted vehicle, a proof message may be send to the token issuer including, for example, a cryptographically-bound proof (e.g. a signature) that the proof message is originating within the TEE. In this case, the token issuer may verify the proof message (e.g. the signature) to assure that the proof message indeed originates from the TEE, and, based on the verification, issue a token that is bound to the TEE. In this case, the token issuer itself may not be exposed to the token collector's unique identity which may increases the overall privacy.

In some aspect, binding techniques (e.g. for binding a token to a vehicle or to a token collector) may include (among others) evidence included in the token. In this mode, the token would need to be associated with some proof of wait, etc.

In some aspect, binding techniques (e.g. for binding a token to a vehicle or to a token collector) may include (among others) establishing a mutually-authenticated session to the vehicle's TEE before issuing the token.

In some aspect, binding techniques (e.g. for binding a token to a vehicle or to a token collector) may include (among others) encrypting the token with a key derived from evidence (e.g. so that only the legitimate holder is able to use the encrypted token).

The receiver of such simple tokens 340s may be expected to store them, since in the traffic management system 100 it is in the receiver's best interest to accumulate as many tokens 140 as possible. Further, the receiver of such simple tokens 340s may provide the simple tokens 340s back to any traffic-managing infrastructure 103 as evidence, e.g. the receiver may provide the tokens 140 to a traffic light at the intersection 305 during approach. In some aspects, the simple tokens 340s may be transmitted to the respective traffic-managing infrastructure 103 as-received; therefore, in some aspects, no additional trust may be needed in the receiver, e.g. in the vehicle or the token collector 120 associated therewith, e.g. aside checking its identity, e.g. by nameplate recognition, to ensure platform binding.

In various aspects, an enhanced token 340e may be generated based on the received simple tokens 340s, e.g. by the respective token collector 120. The enhanced token 340e may be transmitted to the respective traffic-managing infrastructure 103. Enhanced token 340e may be generated in association with trusted connected vehicles only, and may be designed to provide additional protocol capabilities when the vehicle can be trusted to perform transformations on simple tokens 340s. As an example, a vehicle may be trusted to perform transformations on simple tokens 340s when the vehicle includes a token collector 120 that is able to attest to running at least parts of code in a TEE (e.g. in an Intel® SGX enclave). In this case, an enhanced token 340e may be produced at the edge (e.g. in the vehicle's token collector 120) and contains aggregate information from individual simple tokens 340s and additional metadata. The individual simple tokens 340s may be no longer transferred to the token verifier 130 associated with the traffic-managing infrastructure 103. Further, the enhanced token 340e may include an information about total duration of the delay the vehicle has already been exposed to. Further, optional information about vehicle's priority may be included in the enhanced token 340e (illustratively a relative weight in the network), e.g. in the case that the vehicle is a "premium" or emergency vehicle, the vehicle priority may be higher than for a "standard" vehicle. The enhanced token 340e may be signed by the token collector 120 using a privacy-enhancing scheme (e.g. Intel EPID). The enhanced token 340e may not convey information related to the identity of the vehicle and/or token collector 120, its previous whereabouts, or other privacy information.

According to various embodiments, one or more vehicles 101 may communicate with the respective traffic-managing infrastructure 103, or in other words, the token collector 120 associated with the respective vehicle may communicate with the token verifier 130 associated with the respective traffic-managing infrastructure 103.

As an example, the vehicle 101 may be a human-driven or autonomous vehicle which may accumulate tokens during a single trip and may be able to present them to a token verifier 130 of a traffic-managing infrastructure 103 when queried to determine its priority at an intersection 305 (e.g. when stopped).

The communication between the vehicles (i.e. the token collector 120) and the traffic-managing infrastructures (i.e. the respective token issuer 110 and/or token verifier 130) may be configured as Vehicle-to-Infrastructure (V2I) communication, e.g. using technologies like DSRC (Dedicated Short Range Communications), BLE (Bluetooth LowEnergy), etc.

FIG. 3 illustrates exemplarily three vehicles 101 of different types 301a, 301b, 301c. A vehicle 101 of a first type 301a may not have a token collector and, therefore, may not participate in the traffic management system 100. This, illustratively, non-connected vehicle may not take immediate benefits from the traffic management system 100. However, the vehicle 101 of the first type 301a may be considered in so far that it may be sensed using existing technologies (e.g. TMS) and assigned to a default priority/weight.

A vehicle 101 of a second type 301b or a third type 301c may include a token collector 120 that allows a participation in the traffic management system 100, wherein the vehicle 101 of the second type 301b may be illustratively an untrusted connected vehicle and the vehicle 101 of the third type 301c may be a trusted connected vehicle. As illustrated in FIG. 3, a data channel 350 (e.g. a DSRC channel, a BLE channel, etc.) may be established between the token issuer 110 and the token collector 120 as well as between the token collector 120 and the token verifier 130.

The vehicle 101 of the second type may include a token collector 120 that is configured to store simple tokens 340s as-received during the trip and presenting them all to a token verifier 130 when queried. Since the token format has built-in integrity protections, no additional trust may need to be placed in token bearer at the cost of limited privacy. Untrusted connected vehicles may lack enhanced capabilities like weighted priorities and optimizations based on destination. Each time an untrusted connected vehicle participates in an election, it needs to fully disclose its previous whereabouts by sending all of non-expired, accumulated simple tokens 340s, which may identify the locations where obtained, thus allowing recreation of a vehicle's route. In some aspects, a token may include an identifier of an area (e.g. zip-code, geo-bound rectangle coordinates etc.) and not an exact identifier of a particular token issuer. More simply put—the infrastructure may use an EPID-like group signature scheme as well, thus be privacy-enhanced for all vehicles (including untrusted ones)

The vehicle 101 of the third type may include a token collector 120 or a vehicle having an execution engine that is configured to attest to executing a measured code in a secure environment 120e (e.g. SGX enclave, DAL applet, Global Platform TA). If such assertions can be made, the vehicle is said to be certified to produce enhanced tokens 340e. In this case, the vehicle may internally process the simple tokens 340s and produce a proof data structure (i.e. the enhanced token 340e) that includes the computation result (e.g. the total wait time and/or priority) accompanied by measurements of the code that produced the token and signed by a TEE-bound key (e.g. SGX Quote/EPID key), vouching for the measurements and the fact the code has indeed run on a trusted processor. In some aspects, the proof data structure may include or may be associated with a proof-of-wait or a proof of elapsed time.

In some aspects, the traffic management system 100 may include a voting system, with each member (e.g. vehicle) accumulating an increasing number of votes (i.e. token) the longer its trip delay is, and an election conducted each time the vehicles approach a traffic-managing infrastructure (e.g. a traffic light, etc.). The traffic management system 100 allows for decentralized decision making, with each traffic-managing infrastructure making decisions independently from others and may work without global (e.g. Internet) connectivity.

Figure 4:
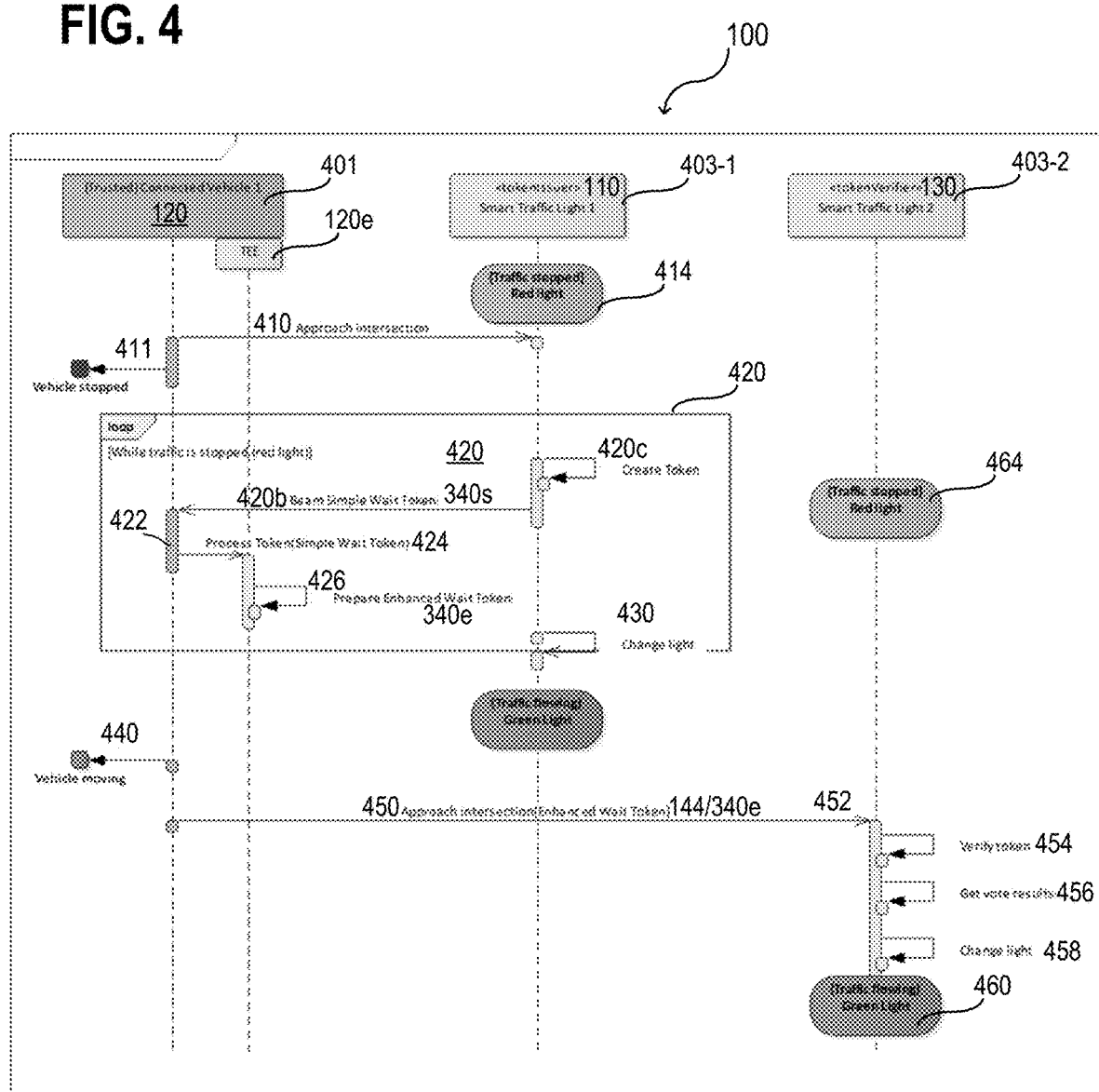
FIG. 4 shows an interaction of various components of a traffic management system in a schematic view, according to some aspects.

FIG. 4 shows—exemplarily—an interaction between a trusted connected vehicle 401 and two smart traffic lights 403-1, 403-2 associated with a traffic management system 100, according to various aspects. In this example, the first smart traffic light 403-1 may be associated with a first location (e.g. a first intersection) and the second smart traffic light 403-2 may be associated with a second location (e.g. a second intersection) distanced (e.g. more than 50 m) from the first location. The term "smart" traffic light may be understood as any type of traffic light including at least on functionality as described herein with the token issuer 110 and/or the token verifier 130. In other words, a "smart" traffic light may include a token issuer 110 and/or a token verifier 130 or may be communicatively coupled with a token issuer 110 and/or a token verifier 130. The trusted connected vehicle 401 may include a token collector 120 and a TEE 120e to execute functions associated with the token collector 120.

In this example, the token issuer 110 associated with the first smart traffic light 403-1 issues one or more simple wait tokens 340s and the token verifier 130 associated with the second smart traffic light 403-2 verifies an enhanced token 340e from the token collector 120 of the trusted connected vehicle 401.

In more detail, the trusted connected vehicle 401 may approach the first location, in 410, and, accordingly, the first smart traffic light 403-1. In the case that the first smart traffic light 403-1 is turned red, the trusted connected vehicle 401 may stop, in 411. While the first smart traffic light 403-1 is turned red 414, the traffic may be stopped, and the trusted connected vehicle 401 may wait in a vicinity of the first smart traffic light 403-1. Therefore, the trusted connected vehicle 401 may collect (in 422) one or more simple wait token 340s issued (in 420) by the token issuer 110 associated with the first smart traffic light 403-1 as long as the traffic is stopped, e.g. as long as the trusted connected vehicle 401 remains in the vicinity of the first smart traffic light 403-1. Issuing the simple wait tokens 340s may include creating the simple wait tokens 340s (in 420c) and beaming the simple wait tokens 340s (in 420b). Using the TEE 120e of the token collector 120, the enhanced wait token 340e may be generated (in 426) based on a processing (in 424) of the received simple wait tokens 340s.

When the first smart traffic light 403-1 turns green again (in 430), the traffic may flow and the trusted connected vehicle 401 may travel further (in 440) and approach (in 450) the second location, and, accordingly, the second smart traffic light 403-2. While the second smart traffic light 403-2 is turned red 464, the traffic may be stopped when the trusted connected vehicle 401 approaches the second smart traffic light 403-2.

The trusted connected vehicle 401 may transmit (in 452) the generated enhanced wait token 340e to the token verifier 130 of the second smart traffic light 403-2. The enhanced wait token 340e received by the token verifier 130 of the second smart traffic light 403-2 may be verified (in 454), analyzed (in 456), and, the second smart traffic light 403-2 may be turned green (in 458) based on the result of the analysis. When the second smart traffic light 403-2 is turned green, in 460, the traffic may flow, and the trusted connected vehicle 401 may not wait at the second smart traffic light 403-2.

Illustratively, a vehicle 401 may approach a first intersection where the traffic light 403-1 may be red. Since the vehicle 401 may have just started its trip, it may not yet have accumulated any token. Therefore, the vehicle 401 may not participate in voting and is counted only as a singular default unit (e.g. as if its current delay during the trip was zero). Because opposite traffic direction has priority at the first intersection, the vehicle 401 may stop and wait for the traffic light to turn green. While the vehicle (and optionally other vehicles) is waiting at the first intersection, the token issuer 110 associated with the traffic light at the first intersection may periodically create simple wait tokens 340s for it. The simple wait tokens 340s may be broadcast the vehicle 401. In some aspects, the simple wait tokens 340s may be broadcast to all waiting vehicles waiting at the first intersection. Since the vehicle 401 may be a trusted (TEE-equipped) entity, it may pass the received simple wait tokens to its TEE engine running trusted processing code, in order to enrich the simple wait tokens 340s (e.g. to convert the simple wait tokens 340s to an enhanced wait token 340e, which may offer additional functionalities). The code within the TEE may act like a token verifier and makes sure the received simple wait tokens 340s are genuine and targeted at this device, and if so, produces the enhanced wait token 340e, signing it with embedded TEE-bound key (e.g. an EPID key, preserving device's anonymity.

In some aspects, the token issuer 110 associated with the traffic light at the first intersection may stop issuing simple wait tokens 340s when the traffic light at the first intersection turns green (e.g. due to external conditions, without influence from the vehicle 401). Accordingly, the traffic may start flowing, and the vehicle 401 may leave the first intersection.

As the vehicle 401 approaches another (e.g. second) intersection (which may currently show a red light on vehicle's driving direction), the enhanced wait token 340e may be preemptively send to the traffic light at this intersection in order to participate in priority determination vote. The token verifier 130 associated with the traffic light at this intersection verifies the received enhanced wait token 340e and may consider it valid. The token verifier 130 may further aggregate voting results from all traffic directions, and incorporates environmental factors, external triggers (e.g. pedestrians), etc. and decides the total priority of the direction from which vehicle 401 is approaching is higher than the opposite direction. Therefore, the traffic light may be changed to green and the vehicle 401 may, in some aspects, drive through this intersection unimpeded.

It has to be understood that various modifications of the interaction between a vehicle and a plurality of smart traffic lights may be implemented analogously. As an example, if the vehicle is a non-trusted vehicle (without a TEE), the token collector 120 may collect all received simple wait tokens 340s and may provide a set 142 including all of the collected simple wait tokens 340s to the token verifier 130 associated with the traffic light at the second intersection. The term collect as used herein with respect to colleting token, etc., may be understood as gathering an accumulation of objects (e.g. tokens). Collecting a plurality of tokens may include receiving one or more tokens from one or more token issuers and storing the received tokens, e.g. in a memory associated with the token collector 120.

Various aspects may be implemented on any device-to-device communication, e.g. established between the token issuer 110 and the token collector 120 as well as between the token collector 120 and the token verifier 130. The functions of the token issuer 110 and the token verifier 130 may be implemented via a single electronic device, e.g. integrated into the traffic-managing infrastructure 103. The token collector 120 may be integrated into a computing system of the vehicle or may be a separated device disposed in the vehicle.

In some aspects, a trusted execution environment hardware may be used to implement at least the functions of the token collector 120. However, the functions of the token issuer 110 and/or the token verifier 130 may be implemented via a trusted execution environment hardware as well. More specifically, a trusted execution environment (TEE) of the token collector 120 (or any other computing system) may be used to reliably verify information for the traffic management system 100 such as a token. In various aspects, this verification may be a proof of waiting of a vehicle in the traffic, wherein the waiting may be caused by one or more traffic-managing infrastructures 103 participating in the traffic management system 100.

A TEE may be implemented within a computing system. As an example, the TEE may be implemented using one or more Software Guard Extensions (SGX) enclaves or another protected domain of a system. These technologies, along with platform infrastructure software can offer a TEE by isolating memory regions from an operating system (OS) and providing access control rules around memory regions, to only allow access to authorized entities. In another example, a logic unit (e.g. an intellectual property block) may be configured to provide a TEE, such as using a converged security manageability engine (CSME). By providing a proof of waiting technique to be executed within a trusted execution environment, the safety of the traffic management system may be increased since it may be ensured that the vehicle providing the tokens to a token verifier to achieve a prioritized treatment at the traffic-managing infrastructure has indeed collected the tokens.

Figure 5:
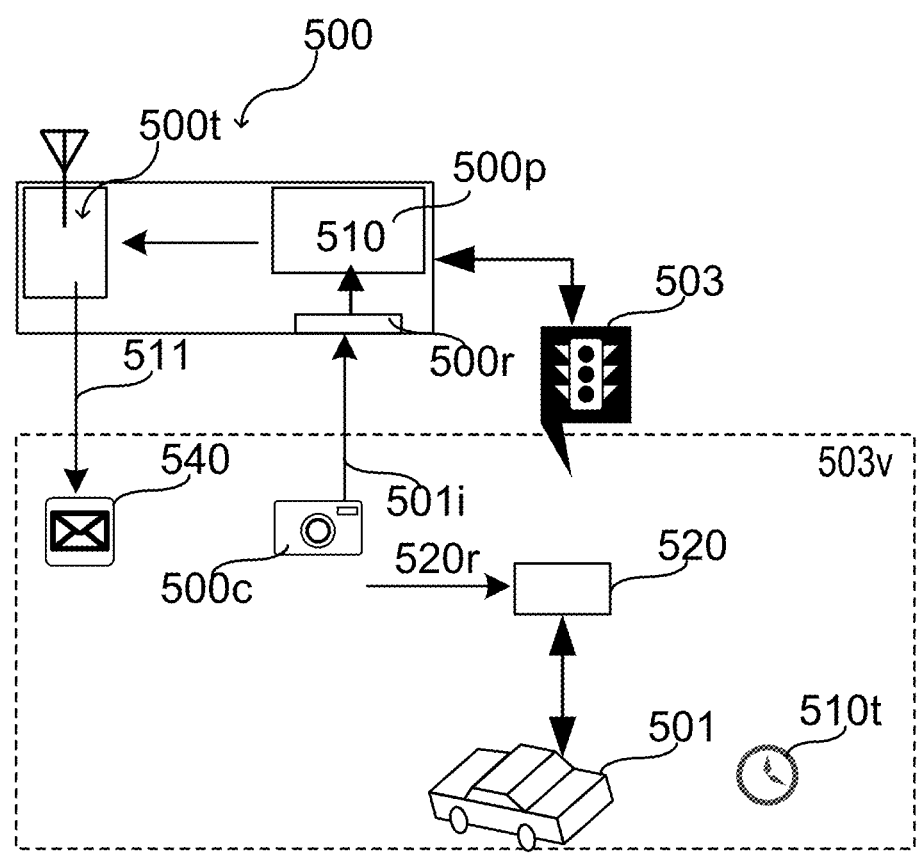
FIG. 5 shows a token issuer in a schematic view, according to some aspects.

FIG. 5 illustrates a token issuer 500 in a schematic view, according to various aspects. In some aspects, the token issuer 500 may be used to issue tokens 540 for a traffic management system 100, as described herein. According to various aspects, the token issuer 500 may be associated with a traffic-managing infrastructure 503, e.g. with a traffic light or any other traffic-managing infrastructure. As an example, the token issuer 500 may be integrated into the traffic-managing infrastructure 503 or may be located near the traffic-managing infrastructure 503. The token issuer 500 may include one or more processors 500p and one or more transmitters 500t. The one or more processors 500p may be configured to generate (in 510) one or more tokens 540. The one or more tokens 540 may represent a waiting time 510t of one or more vehicles 501 waiting in a vicinity 503v of the traffic-managing infrastructure. The one or more transmitters 500t may be used to transmit (in 511) the one or more tokens 540 within the vicinity 503v. The transmitting 511 of the one or more tokens 540 within the vicinity 503v may allow a reception (in 520r) of the one or more tokens 540 by one or more tokens collectors 520 associated with the one or more vehicles 501.

In a first aspect, the token issuer 500 may identify the one or more vehicles 501 when they are in the vicinity 503v of the traffic-managing infrastructure 503 and generate the one or more tokens 540 that are associated only with the identified one or more vehicles 501. As an example, the vehicle identity may be encoded in the respective one or more tokens 540. Each token 540 may include either a single vehicle identity corresponding to the respective vehicle or a list of all vehicles detected in the vicinity 503v. The generation and transmission of the one or more tokens 540 may be carried out in a pre-defined timer interval, e.g. in a time interval in the range from about 0.1 s to about 60 s or e.g. e.g. in a time interval in the range from about 0.1 s to about 30 s.

According to various aspects, an alternative to a periodic token issuance may be to Sense a vehicle approaching, calculate the time spent in queue (e.g. within the token issuer, e.g. this part may be trusted), and upon sensing the vehicle leaving (or dispatching the vehicle, by changing the traffic light), issuing a single token representing the waiting time of the respective vehicle. This principle may be applicable in non-vehicle situations (e.g. in a multi-queue distributed workload system or a network packet, where each processor/transferring node would stamp the packet/workload with the time it was waiting for processing at that node.

According to various aspects, the one or more transmitters 500t may be configured to transmit the tokens 540 with a transmitting range from about 10 m to about 100 m, e.g. from about 10 m to about 50 m. The one or more transmitters 500t may be configured to transmit the tokens substantially into a specific direction. This may allow issuing distinct tokens for vehicles at an intersection waiting in lanes with different driving directions. In some aspects, the token issuer 500 may include one or more receivers 500r configured to receive vehicle identification information 501i associated with the one or more vehicles 501 located in the vicinity 503v of the traffic-managing infrastructure 503. The vehicle identification information 501i may be determined for example by one or more imaging devices 500c. However, there may be various other implementations to determine the vehicle identification information 501i. As an example, the respective one or more vehicles 501 may proactively identify themselves via a communication channel that is established between one or more components (e.g. the token collector 520) of the respective vehicle and the traffic-managing infrastructure 503. The one or more processors 500p may be configured to consider the vehicle identification information 501i during generation 510 of the one or more tokens 540.

In some aspects, the more processors 500p may be configured to generate one or more tokens without considering any received tokens, e.g. only based on the vehicle identification information 501i. As an example, a trusted connected vehicle (e.g. an emergency vehicle) may be configured to generate an enhanced token out of nothing and to send the enhanced token to the token verifier to identify its priority.

According to various aspects, a traffic management system may include a token issuer 500 associated with a traffic infrastructure 503, wherein the token issuer 500 may be configured to carry out a token issue operation at a pre-defined time interval, the token issue operation may include generating a token 540 that represents a waiting time 510t of one or more vehicles 501 in a vicinity 503v of the traffic infrastructure 503 and beaming the token 540 within the vicinity of the traffic-managing infrastructure 503 to allow a reception 520r of the token 540 by one or more tokens collectors 520 associated with the one or more vehicles 501 in the vicinity 503v of the traffic infrastructure 503.

FIG. 6 illustrates a token collector 600 in a schematic view, according to various aspects. In some aspects, the token collector 600 may be used to collect tokens 540 that are utilized in a traffic management system 100, as described herein. According to various aspects, the token collector 600 may be associated with a vehicle 601. Therefore, illustratively, the vehicle may gather an accumulation of tokens 640 by collecting (in 610) one or more tokens 540 when the vehicle has to wait in a vicinity 503v of a traffic-managing infrastructure 503 having a token issuer 500 associated therewith, see FIG. 5.

According to various aspects, the token collector 600 may include one or more processors 600p, one or more receivers 600r, and one or more transmitters 600t. The one or more receivers 600r may be configured to receive one or more tokens 540 issued by one or more token issuers 500. The one or more processors 600p may be configured to accumulate (in 620) the received one or more tokens 540.

The accumulation of tokens 640 may be bound to the vehicle 601. Whenever the vehicle is in a vicinity 603v of a traffic-managing infrastructure 603 having a token verifier 630 associated therewith, the one or more processors 600p may be configured to transmit the accumulation of tokens 640 via the one or more transmitters 600t. This allows the reception 630r of the accumulation of tokens 640 via the token verifier 630 to control the traffic-managing infrastructure 603 associated therewith.

In a similar way, the token verifier 630 may be associated with another vehicle 611. In this case, the transmission of the accumulation of tokens 640 via the one or more transmitters 600t allows the reception 630r of the accumulation of tokens 640 via the token verifier 630 to control the other vehicle 611 associated therewith.

According to various aspects, each of the one or more tokens 540 issued by the token issuer 500 may representing a waiting time of the respective vehicle 601 in a respective vicinity of one or more traffic-managing infrastructures having a token issuer 500 associated therewith. The accumulation of tokens 640 may represent a total waiting time of the respective vehicle 601 during a trip.

According to various embodiments, a traffic management system may include a token collector 600 associated with a vehicle 601, wherein the token collector 600 is configured to collect one or more tokens 540 associated with a travel of the vehicle 601, each of the collected one or more tokens 540 representing a waiting time of the vehicle 601 in a respective vicinity 503v of one or more traffic-managing infrastructures 503, and transmit an data structure representing the collected one or more tokens.

Figure 7:
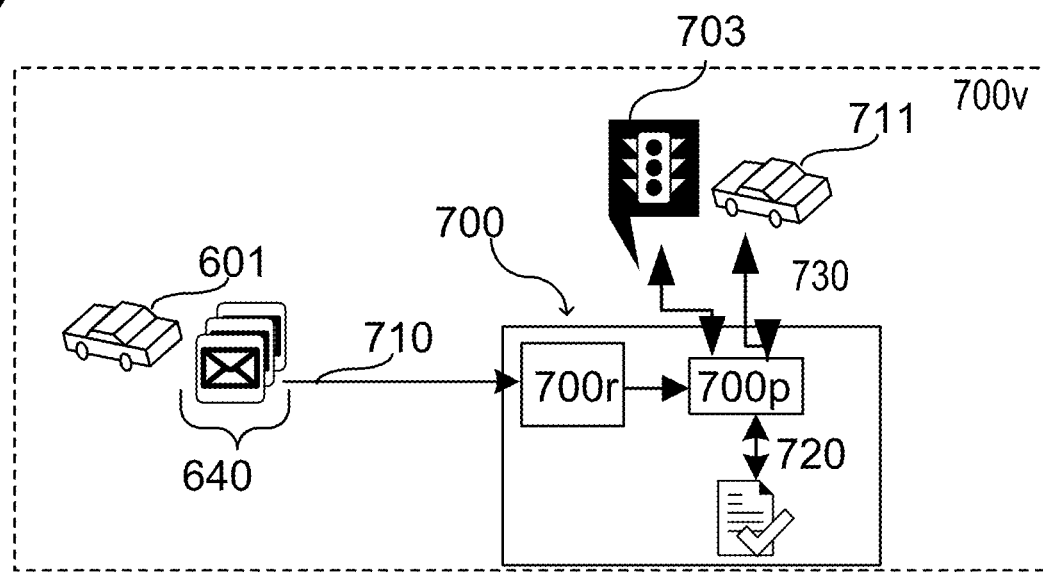
FIG. 7 shows a token verifier in a schematic view, according to some aspects.

FIG. 7 illustrates a token verifier 700 in a schematic view, according to various aspects. In some aspects, the token verifier 700 may be configured to receive and verify an accumulation of tokens that are utilized in a traffic management system 100, as described herein. Further, the token verifier 700 may be configured to control a traffic-managing infrastructure 703 or trigger a control of the traffic-managing infrastructure 703 that is associated with the token verifier 700. Alternatively, the token verifier 700 may be configured to control another vehicle 711 or trigger a control of the other vehicle 711 that is associated with the token verifier 700.

According to various aspects, the token verifier 700 may include one or more processors 700p and one or more receivers 700r. The one or more receivers 700r may be configured to receive (in 710) an accumulation of tokens 640 from at least one vehicle 601 (see FIG. 6) in a vicinity 700v of the one or more receivers 700r (i.e. in a vicinity of the token verifier 700). The accumulation of tokens 640 may represent an accumulated waiting time of the at least one vehicle 601 due to traffic.

The one or more processors 700*p* may be configured to determine (in 720) whether the at least one vehicle 601 may be prioritized or not. The determination may be based on the received accumulation of tokens 640. The higher the accumulated waiting time represented by the accumulation of tokens 640 the higher the change to be prioritized. Further, the one or more processors 700*p* may be configured to at least trigger (in 730) a control of at least one of a traffic-managing infrastructure 703 associated with the token verifier 700 or a vehicle 711 associated with the token verifier 700 based on the determination. The token verifier 700 may include integrated into the traffic-managing infrastructure 703 or into the vehicle 711 associated therewith.

According to various aspects, a traffic management system may include a token verifier 700 associated with a traffic-managing infrastructure 703, wherein the token verifier 700 may be configured to receive 710, from at least one vehicle 601 in a vicinity 700*v* of the token verifier 700, an accumulation of tokens 640, determine 720 whether the at least one vehicle 601 is prioritized or not based on the received accumulation of tokens 640, and trigger 730 a control of the a traffic-managing infrastructure 703 based on the determination.

According to various aspects, a traffic management system may include a token verifier 700 associated with a vehicle 711, wherein the token verifier 700 may be configured to receive 710 an accumulation of tokens 640 from at least one vehicle 601 located in a vicinity 700*v* of the token verifier 700, determine 720 whether the at least one vehicle 601 is prioritized or not based on the received accumulation of tokens 640, and trigger 730 a control of the a vehicle 711 associated with the token verifier 700 based on the determination.

According to various aspects, a vehicle may include a receiver configured to receive a plurality of tokens 540 issued from a plurality of token issuers 500; the plurality of token issuers 500 may be associated with a plurality of traffic-managing infrastructures 503. The vehicle may further include one or more processors configured to provide a trusted execution environment (TEE) to generate an accumulation of tokens 640 based on plurality of received tokens 540, the accumulation of tokens 640 representing an identity of the vehicle and an accumulated waiting time of the vehicle at the plurality of traffic-managing infrastructures 503.

Figure 8:
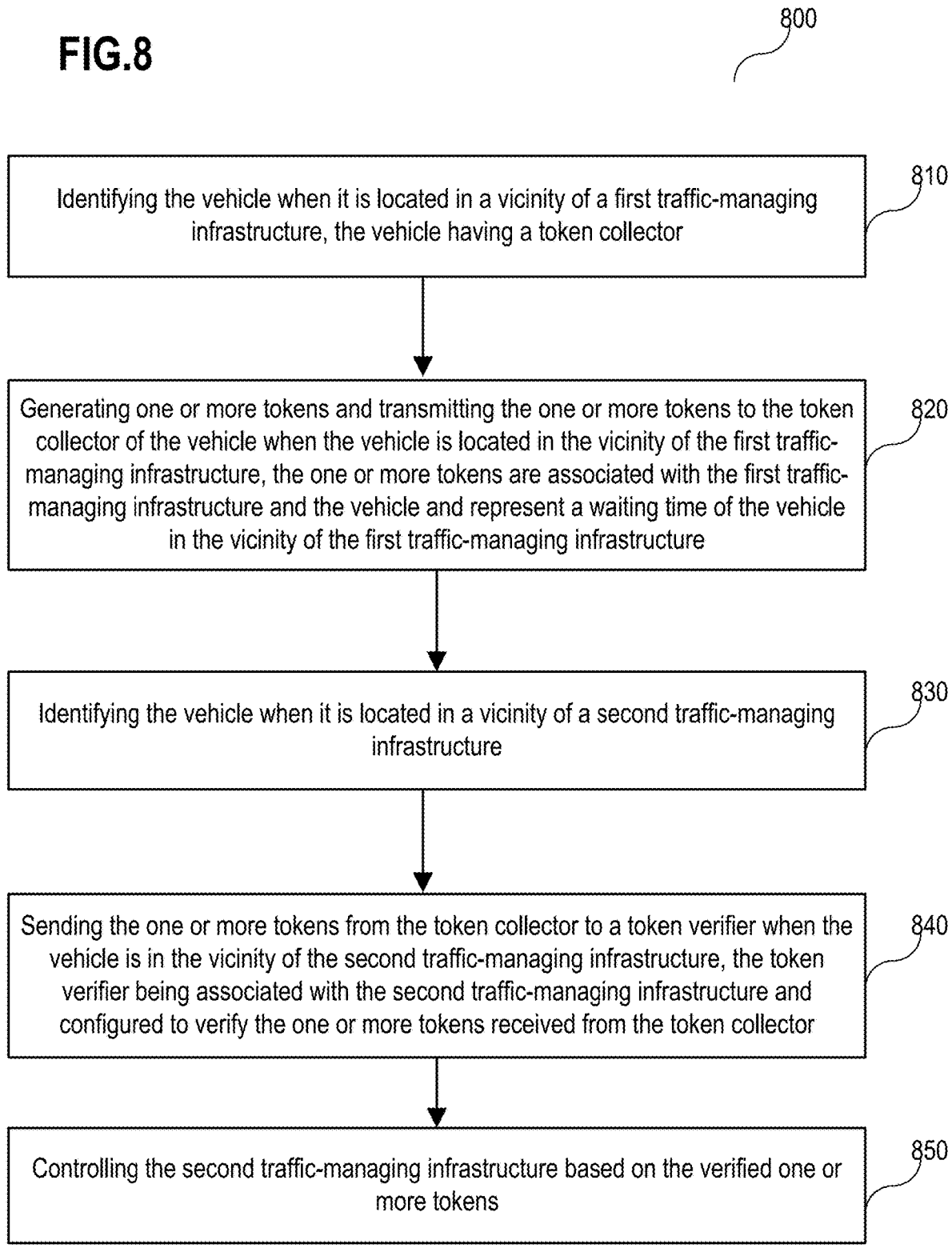
FIGS. 8 to 10 show exemplary flow diagrams of various methods for managing a vehicle in traffic, according to some aspects.

FIG. 8 shows a flow diagram of a method 800 for managing a vehicle in traffic, according to various aspects. The method 800 may include: in 810, identifying the vehicle when it is located in a vicinity of a first traffic-managing infrastructure, the vehicle including a token collector; in 820, generating one or more tokens and transmitting the one or more tokens to the token collector of the vehicle when the vehicle is located in the vicinity of the first traffic-managing infrastructure, the one or more tokens are associated with the first traffic-managing infrastructure and the vehicle and may represent a waiting time of the vehicle in the vicinity of the first traffic-managing infrastructure; in 830, identifying the vehicle when it is located in a vicinity of a second traffic-managing infrastructure; in 840, sending the one or more tokens from the token collector to a token verifier when the vehicle is in the vicinity of the second traffic-managing infrastructure, the token verifier being associated with the second traffic-managing infrastructure and configured to verify the one or more tokens received from the token collector; and, in 850, controlling the second traffic-managing infrastructure based on the verified one or more tokens. In some aspects, the said association of the tokens with traffic-managing infrastructure may not imply being able to identify the origin of a token (e.g. the token may be already anonymized to a certain degree).

In some aspects, the vehicle is identified in the vicinity of the first traffic-managing infrastructure and/or in the vicinity of the second traffic-managing infrastructure via one or more cameras associated with the respective traffic-managing infrastructure.

Figure 9:
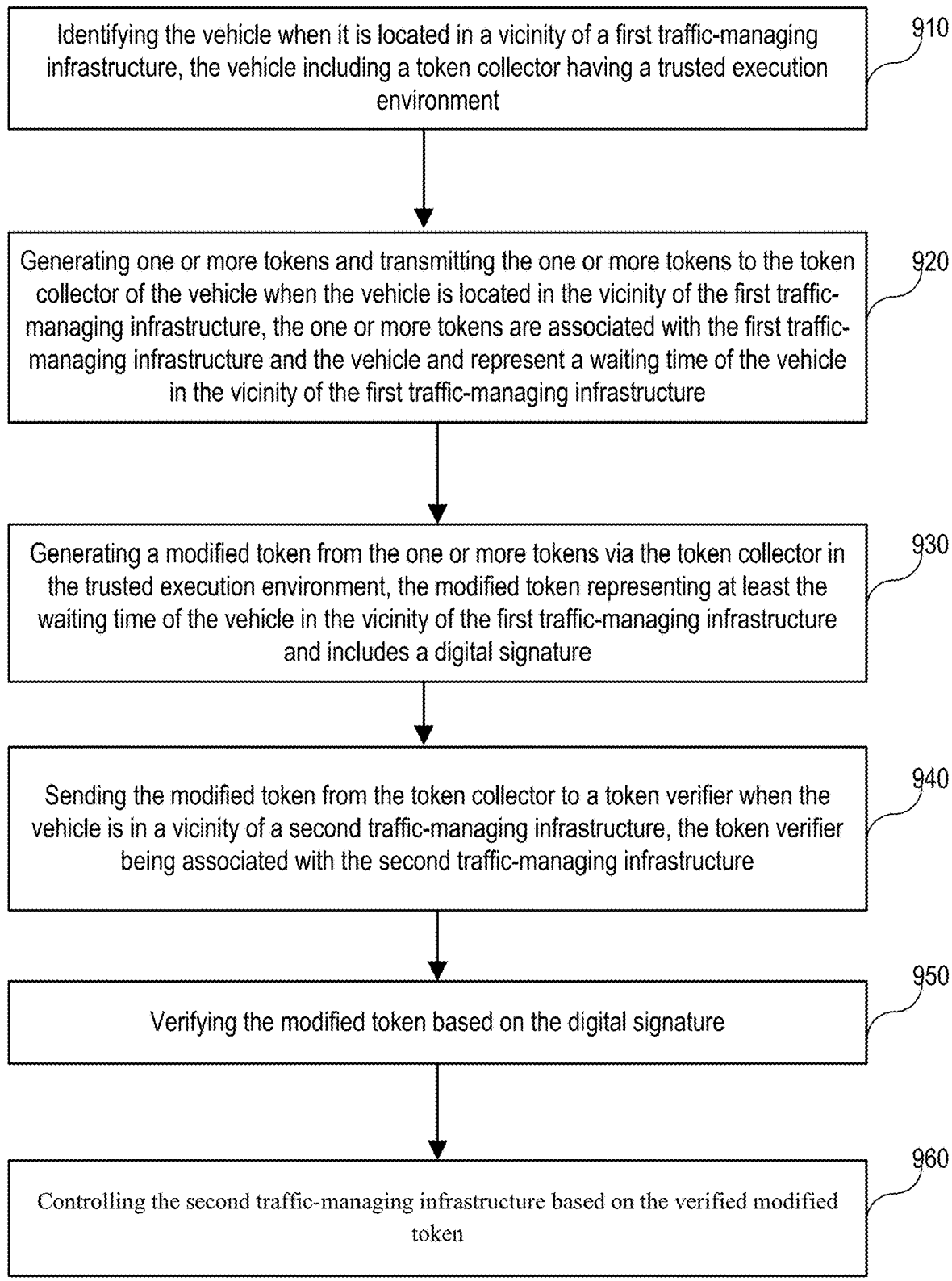

FIG. 9 shows a flow diagram of a method 900 for managing a vehicle in traffic, according to various aspects. The method 900 may include: in 910, identifying the vehicle when it is located in a vicinity of a first traffic-managing infrastructure, the vehicle including a token collector having a trusted execution environment; in 920, generating one or more tokens and transmitting the one or more tokens to the token collector of the vehicle when the vehicle is located in the vicinity of the first traffic-managing infrastructure, the one or more tokens are associated with the first traffic-managing infrastructure and the vehicle and may represent a waiting time of the vehicle in the vicinity of the first traffic-managing infrastructure; in 930, generating a modified token from the one or more tokens via the token collector in the trusted execution environment, the modified token representing at least the waiting time of the vehicle in the vicinity of the first traffic-managing infrastructure and having a digital signature; in 940, sending the modified token from the token collector to a token verifier when the vehicle is in a vicinity of a second traffic-managing infrastructure, the token verifier being associated with the second traffic-managing infrastructure; in 950, verifying the modified token based on the digital signature; and, in 960, controlling the second traffic-managing infrastructure based on the verified modified token.

In some aspects, the digital signature may be based on (e.g. generated by) a privacy-enhancing scheme. The privacy-enhancing scheme may include a direct anonymous attestation (DAA) algorithm, such as, for example, an enhanced privacy identification (EPID).

Figure 10:
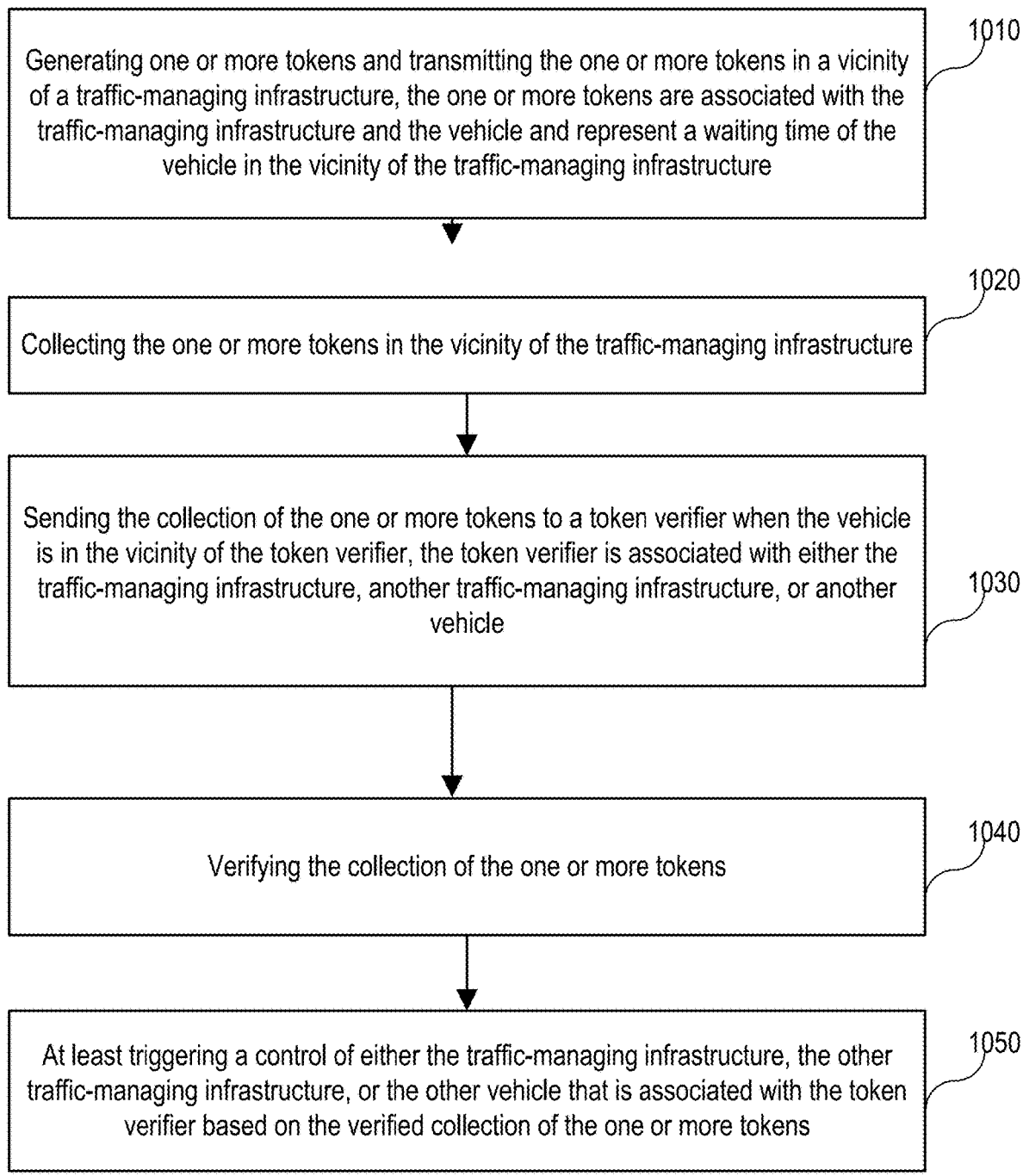

FIG. 10 shows a flow diagram of a method 1000 for managing a vehicle in traffic, according to various aspects. The method 1000 may include: in 1010, generating one or more tokens and transmitting the one or more tokens in a vicinity of a traffic-managing infrastructure, the one or more tokens are associated with the traffic-managing infrastructure and the vehicle and may represent a waiting time of the vehicle in the vicinity of the traffic-managing infrastructure; in 1020, collecting the one or more tokens in the vicinity of the traffic-managing infrastructure; in 1030, sending the collection of the one or more tokens to a token verifier when the vehicle is in the vicinity of the token verifier, the token verifier is associated with either the traffic-managing infrastructure, another traffic-managing infrastructure, or another vehicle; in 1040, verifying the collection of the one or more tokens; and, in 1050, at least triggering a control of either the traffic-managing infrastructure, the other traffic-managing infrastructure, or the other vehicle that is associated with the token verifier based on the verified collection of the one or more tokens.

According to various embodiments, the collection or accumulation of the one or more tokens may be transmitted as a set of single tokens or as a data structure (also referred to as modified token or enhanced token) generated from the single tokens.

In the following, various examples are described relating to aspects and figures described herein.

Example 1 is a token issuer associated with a traffic-managing infrastructure, the token issuer including: one or more processors and one or more transmitters, wherein the one or more processors are configured to generate one or more tokens, the one or more tokens representing a waiting time of one or more vehicles waiting in a vicinity of the traffic-managing infrastructure, and transmitting the one or more tokens within the vicinity via the one or more transmitters.

In Example 2, the token issuer of example 1 may further include one or more receivers configured to receive vehicle identification information associated with the one or more vehicles.

In Example 3, the token issuer of example 2 may further include that the one or more processors are configured to consider the vehicle identification information during generation of the one or more tokens.

In Example 4, the token issuer of example 2 or 3 may further include that the vehicle identification information represents a respective license plate (also referred to as vehicle registration number) for each of the one or more vehicles.

In Example 5, the token issuer of any one of examples 1 to 4 may further include that the one or more processors are configured to transmitting the one or more tokens in a pre-determined time interval.

In Example 6, the token issuer of any one of examples 1 to 5 may further include that the one or more transmitters are configured to transmit the one or more tokens via a unidirectional broadcast channel.

In Example 7, the token issuer of any one of examples 1 to 6 may further include that each of the one or more tokens includes a unique identifier of the traffic-managing infrastructure.

In Example 8, the token issuer of example 7 may further include that the unique identifier represents geo coordinates of the traffic-managing infrastructure associated with the token issuer.

In Example 9, the token issuer of any one of examples 1 to 8 may further include that each of the one or more tokens includes a time stamp.

In Example 10, the token issuer of any one of examples 1 to 9 may further include that each of the one or more tokens includes a digital signature representing authenticity of the respective token.

In Example 11, the token issuer of any one of examples 1 to 10 may further include that the traffic-managing infrastructure associated with the token issuer includes at least one traffic light.

Example 12 is a token collector (e.g. associated with a vehicle, with a traffic-managing infrastructure, etc.) including: one or more processors, one or more receivers, and one or more transmitters; wherein the one or more receivers are configured to receive one or more tokens issued by one or more tokens issuers, and wherein the one or more processors are configured to accumulate the one or more tokens, and transmit an accumulation of tokens that is at least correlated with the one or more tokens via the one or more transmitters.

In Example 13, the token collector of example 12 may further include that the one or more tokens issued by one or more tokens issuers represent a waiting time of the vehicle in a respective vicinity of one or more traffic-managing infrastructures.

In Example 14, the token collector of example 12 or 13 may further include: one or more memories, wherein the one or more processors are configured to store the received one or more tokens in the one or more memories.

In Example 15, the token collector of any one of examples 12 to 14 may further include that each of the one or more tokens includes a unique identifier of the traffic-managing infrastructure.

In Example 16, the token collector of example 15 may further include that the unique identifier represents geo coordinates of the traffic-managing infrastructure associated with the token issuer.

In Example 17, the token collector of any one of examples 12 to 16 may further include that each of the one or more tokens includes a time stamp.

In Example 18, the token collector of any one of examples 12 to 17 may further include that each of the one or more tokens includes a digital signature representing authenticity of the respective token.

In Example 19, the token collector of any one of examples 12 to 18 may further include that the accumulation of tokens is a set of the received one or more tokens.

In Example 20, the token collector of any one of examples 12 to 18 may further include that the accumulation of tokens includes a single modified token that is generated form the received one or more tokens.

In Example 21, the token collector of example 20 may further include a trusted execution environment, wherein the modified token is generated via the one or more processors in the trusted execution environment.

In Example 22, the token collector of example 20 or 21 may further include that the modified token includes a digital signature representing its authenticity.

In Example 23, the token collector of example 22 may further include that the digital signature is based on a privacy-enhancing scheme.

In Example 24, the token collector of example 23 may further include that the privacy-enhancing scheme includes a direct anonymous attestation (DAA) algorithm.

In Example 25, the token collector of example 24 may further include that the direct anonymous attestation (DAA) algorithm includes an enhanced privacy identification.

In Example 26, the token collector of any one of examples 20 to 25 may further include that the modified token represents a total duration of delay the vehicle has been exposed during a trip.

In Example 27, the token collector of any one of examples 20 to 26 may further include that the modified token includes a priority information representing a priority of the vehicle.

Example 28 is a token verifier including: one or more processors and one or more receivers, wherein the one or more receivers are configured to receive, from at least one vehicle in a vicinity of the one or more receivers, an accumulation of tokens representing an accumulated waiting time of the at least one vehicle, wherein the one or more processors are configured to determine, based on the received accumulation of tokens, whether the at least one vehicle is prioritized or not, and, based on the determination, trigger a control of a traffic-managing infrastructure or a vehicle associated with the token verifier.

In Example 29, the token verifier of example 28 may further include that determining whether the at least one vehicle is prioritized or not includes verifying the received accumulation of tokens and to only prioritize the at least one vehicle when the accumulation of tokens is verified.

In Example 30, the token verifier of example 28 or 29 may further include that the accumulation of tokens includes a set of one or more tokens issued by one or more tokens issuers, each of the one or more tokens representing a waiting time of the at least one vehicle in a respective vicinity of the one or more tokens issuers.

In Example 31, the token verifier of example 28 or 29 may further include that the accumulation of tokens includes a modified token generated from one or more tokens issued by one or more tokens issuers, each of the one or more tokens representing a waiting time of the at least one vehicle in a respective vicinity of the one or more tokens issuers.

In Example 32, the token verifier of example 31 may further include that the modified token includes a digital signature representing its authenticity.

In Example 33, the token verifier of example 32 may further include that the digital signature is based on a privacy-enhancing scheme.

In Example 34, the token verifier of example 33 may further include that the privacy-enhancing scheme includes a direct anonymous attestation (DAA) algorithm.

In Example 35, the token verifier of example 34 may further include that the direct anonymous attestation (DAA) algorithm includes an enhanced privacy identification.

In Example 36, the token verifier of any one of examples 31 to 35 may further include that the modified token represents a total duration of delay the at least one vehicle has been exposed during a trip.

In Example 37, the token verifier of any one of examples 31 to 36 may further include that the modified token includes a priority information representing a priority of the at least one vehicle.

In Example 38, the token verifier of example 30 or 37 may further include that each of the one or more tokens includes a unique identifier of the traffic-managing infrastructure.

In Example 39, the token verifier of example 38 may further include that the unique identifier represents geo coordinates of the traffic-managing infrastructure associated with the token issuer.

In Example 40, the token verifier of any one of examples 30 to 39 may further include that each of the one or more tokens includes a time stamp.

In Example 41, the token verifier of any one of examples 30 to 40 may further include that each of the one or more tokens includes a digital signature representing authenticity of the respective token.

Example 42 is a traffic management system, including: a token issuer associated with a first traffic-managing infrastructure, a token collector associated with a vehicle, and a token verifier associated with a second traffic-managing infrastructure, wherein the token issuer is configured to issue one or more tokens, wherein the token collector is configured to collect the one or more tokens when the vehicle is in a vicinity of the first traffic-managing infrastructure and send the one or more collected tokens to the token verifier when the vehicle is in a vicinity of the second traffic-managing infrastructure, wherein the token verifier is configured to trigger a control of the second traffic-managing infrastructure based on the one or more collected tokens.

In Example 43, the traffic management system of example 42 may further include that the data each of the one or more tokens represents a waiting time of the vehicle at the first traffic-managing infrastructure.

Example 44 is a traffic management system, including: a token issuer associated with a first traffic-managing infrastructure, a token collector associated with a vehicle, and a token verifier associated with a second traffic-managing infrastructure, wherein the token issuer is configured to issue one or more tokens, wherein the token collector is configured to receive the one or more tokens when the vehicle is in a vicinity of the first traffic-managing infrastructure, generate a modified token based on the one or more tokens, and send the modified token to the token verifier when the vehicle is in a vicinity of the second traffic-managing infrastructure, wherein the token verifier is configured to trigger a control of the second traffic-managing infrastructure based on the modified token.

In Example 45, the traffic management system of example 44 may further include a trusted execution environment, wherein the modified token is generated via one or more processors in the trusted execution environment.

Example 46 is a vehicle including: a receiver configured to receive a plurality of tokens emitted from a plurality of token issuers, the plurality of token issuers are associated with a plurality of traffic-managing infrastructures; one or more processors configured to provide a trusted execution environment to generate an accumulation of tokens based on plurality of received token, the accumulation of tokens representing an identity of the vehicle and an accumulated waiting time of the vehicle at the plurality of a traffic-managing infrastructures.

Example 47 is a method for managing a vehicle in traffic, the method including: identifying the vehicle when it is located in a vicinity of a first traffic-managing infrastructure, the vehicle including a token collector; generating one or more tokens and transmitting the one or more tokens to the token collector of the vehicle when the vehicle is located in the vicinity of the first traffic-managing infrastructure, the one or more tokens are associated with the first traffic-managing infrastructure and the vehicle and represent a waiting time of the vehicle in the vicinity of the first traffic-managing infrastructure; identifying the vehicle when it is located in a vicinity of a second traffic-managing infrastructure; sending the one or more tokens from the token collector to a token verifier when the vehicle is in the vicinity of the second traffic-managing infrastructure, the token verifier being associated with the second traffic-managing infrastructure and configured to verify the one or more tokens received from the token collector; and controlling the second traffic-managing infrastructure based on the verified one or more tokens.

In Example 48, the method of example 46 may further include that the vehicle is identified in the vicinity of the first traffic-managing infrastructure via one or more first cameras associated with the first traffic-managing infrastructure.

In Example 49, the method of example 47 or 48 may further include that the vehicle is identified in the vicinity of the second traffic-managing infrastructure via one or more second cameras associated with the second traffic-managing infrastructure.

Example 50 is a method for managing a vehicle in traffic, the method including: identifying the vehicle when it is located in a vicinity of a first traffic-managing infrastructure, the vehicle including a token collector having a trusted execution environment; generating one or more tokens and transmitting the one or more tokens to the token collector of the vehicle when the vehicle is located in the vicinity of the first traffic-managing infrastructure, the one or more tokens are associated with the first traffic-managing infrastructure and the vehicle and represent a waiting time of the vehicle in the vicinity of the first traffic-managing infrastructure; generating a modified token from the one or more tokens via the token collector in the trusted execution environment, the modified token representing at least the waiting time of the vehicle in the vicinity of the first traffic-managing infrastructure and includes a digital signature; sending the modified token from the token collector to a token verifier when the vehicle is in a vicinity of a second traffic-managing infrastructure, the token verifier being associated with the second traffic-managing infrastructure; verifying the modified token received from the token collector based on the digital signature; and controlling the second traffic-managing infrastructure based on the verified modified token.

In Example 51, the method of example 50 may further include that the digital signature is based on a privacy-enhancing scheme.

In Example 52, the method of example 51 may further include that the privacy-enhancing scheme includes a direct anonymous attestation (DAA) algorithm.

In Example 53, the method of example 52 may further include that the direct anonymous attestation (DAA) algorithm includes an enhanced privacy identification.

Example 54 is a method for managing a vehicle in traffic, the method including: generating one or more tokens and transmitting the one or more tokens in a vicinity of a traffic-managing infrastructure, the one or more tokens are associated with the traffic-managing infrastructure and the vehicle and represent a waiting time of the vehicle in the vicinity of the traffic-managing infrastructure; collecting the one or more tokens in the vicinity of the traffic-managing infrastructure; sending the collection of the one or more tokens to a token verifier when the vehicle is in the vicinity of the token verifier, the token verifier is associated with either the traffic-managing infrastructure, another traffic-managing infrastructure, or another vehicle; verifying the collection of the one or more tokens; and at least triggering a control of either the traffic-managing infrastructure, the other traffic-managing infrastructure, or the other vehicle that is associated with the token verifier based on the verified collection of the one or more tokens.

In Example 55, the method of example 54 may further include that collecting the one or more tokens includes receiving the one or more tokens and generating the collection of the one or more tokens based on a privacy-enhancing scheme. The collection of the one or more tokens may be a single modified token generated form the one or more tokens based on the privacy-enhancing scheme.

In some aspects, an enhanced token issuer or a token converter may be associated with a traffic-managing infrastructure. As an example, if the vehicle is not a trusted vehicle it may communicate to the traffic-managing infrastructure to issue an enhanced token for it. The vehicle may, for example, send all simple tokens that have been collected by the vehicle to the token converter of the traffic-managing infrastructure and the token converter of the traffic-managing infrastructure may issue (e.g. generate and transmit) an enhanced token based thereon. Those would then be additive, implying the vehicle may at the same time be in possession of zero-to-one enhanced tokens (e.g. issued by a token collector associated with a traffic-managing infrastructure) as well as zero-to-many simple tokens with timestamp greater than one of the Token (e.g. accumulated on top).

In some aspects, a traffic managing infrastructure may be configured to sense a non-TEE (e.g. emergency) vehicle using other means (e.g. camera, etc.), and may issue an enhanced token for the sensed non-TEE (emergency) vehicle automatically via an enhanced token issuer.

Example 56 is a token issuer associated with a traffic-managing infrastructure (e.g. a data traffic-managing infrastructure, etc.), the token issuer including: one or more processors, wherein the one or more processors are configured to generate one or more tokens, the one or more tokens representing a delay of one or more structures (e.g. one or more data structures, etc.) during handling via the traffic-managing infrastructure, and binding the one or more tokens to the one or more structures.

Example 57 is a token collector associated with a traffic-managing infrastructure (e.g. with a data traffic-managing infrastructure), the token collector including: one or more processors configured to receive one or more tokens issued by one or more token issuers, accumulate the one or more tokens, and transmit an accumulation of tokens that is at least correlated with the one or more tokens.

Example 58 is a token verifier including: one or more processors configured to receive a structure (e.g. a data structure), the structure including an accumulation of tokens representing an accumulated delay time during handling the structure via one or more traffic-managing infrastructures (e.g. via one or more data traffic-managing infrastructures), and determine, based on the received accumulation of tokens, whether the structure is prioritized or not, and, based on the determination, trigger a control of a traffic-managing infrastructure associated with the token verifier.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A token issuer associated with a traffic-managing infrastructure, the token issuer comprising:
   one or more processors;
   one or more transmitters; and
   one or more receivers,
   wherein the one or more processors are configured to:
      generate one or more tokens, the one or more tokens representing a waiting time of one or more vehicles waiting in a vicinity of the traffic-managing infrastructure, and
      provide the one or more tokens for transmission within the vicinity of the traffic-managing infrastructure via the one or more transmitters,
   wherein the one or more receivers are configured to receive vehicle identification information associated with the one or more vehicles,
   wherein the one or more processors are further configured to consider the vehicle identification information during generation of the one or more tokens.

2. The token issuer of claim 1,
   wherein the one or more transmitters are configured to transmit the one or more tokens at a pre-determined time interval.

3. The token issuer of claim 1,
   wherein each respective token of the one or more tokens comprises a unique identifier of the traffic-managing infrastructure.

4. The token issuer of claim 1,
   wherein each respective token of the one or more tokens comprises a time stamp.

5. The token issuer of claim 1,
   wherein each respective token of the one or more tokens comprises a digital signature representing an authenticity of the respective token.

6. A method for managing a vehicle in traffic, the method comprising:
   generating one or more tokens and transmitting the one or more tokens in a vicinity of a traffic-managing infrastructure, wherein the one or more tokens are associated with the traffic-managing infrastructure and the vehicle,
wherein the one or more tokens represent a waiting time of the vehicle in the vicinity of the traffic-managing infrastructure;
collecting the one or more tokens in the vicinity of the traffic-managing infrastructure;
sending the collection of the one or more tokens to a token verifier when the vehicle is in a vicinity of the token verifier,
wherein the token verifier is associated with the traffic-managing infrastructure, another traffic-managing infrastructure, or another vehicle;
verifying the collection of the one or more tokens; and
at least triggering a control of the traffic-managing infrastructure, the other traffic-managing infrastructure, or the other vehicle that is associated with the token verifier, based on the verified collection of the one or more tokens.

7. The method of claim 6,
wherein collecting the one or more tokens in the vicinity of the traffic-managing infrastructure comprises:
receiving the one or more tokens and generating the collection of the one or more tokens based on a privacy-enhancing scheme.

8. The token issuer of claim 1,
wherein the one or more transmitters are configured to transmit the one or more tokens via a unidirectional broadcast channel.

9. The token issuer of claim 3,
wherein the unique identifier of the traffic-managing infrastructure represents geographic coordinates of the traffic-managing infrastructure associated with the token issuer.

10. The token issuer of claim 1,
wherein the traffic-managing infrastructure includes at least one traffic light.

11. The token issuer of claim 1,
wherein the vehicle identification information represents a vehicle registration number for each vehicle of the one or more vehicles.

12. The token issuer of claim 1,
wherein the token issuer is integral with the traffic-managing infrastructure.

13. A method for a token issuer associated with a traffic-managing infrastructure, the method comprising:
receiving, by one or more receivers of the token issuer, vehicle identification information associated with one or more vehicles waiting in a vicinity of the traffic-managing infrastructure;
generating, by one or more processors of the token issuer, one or more tokens, the one or more tokens representing a waiting time of the one or more vehicles waiting in the vicinity of the traffic-managing infrastructure; and
providing, by the one or more processors, the one or more tokens for transmission within the vicinity of the traffic-managing infrastructure via one or more transmitters of the token issuer,
wherein generating, by the one or more processors, the one or more tokens comprises:
considering, by the one or more processors, the vehicle identification information.

14. The method of claim 13, further comprising:
transmitting, by the one or more transmitters, the one or more tokens at a pre-determined time interval.

15. The method of claim 13,
wherein each respective token of the one or more tokens comprises a unique identifier of the traffic-managing infrastructure.

16. The method of claim 13,
wherein each respective token of the one or more tokens comprises a time stamp.

17. The method of claim 13,
wherein each respective token of the one or more tokens comprises a digital signature representing an authenticity of the respective token.

18. The method of claim 13, further comprising:
transmitting, by the one or more transmitters, the one or more tokens via a unidirectional broadcast channel.

19. The method of claim 15,
wherein the unique identifier of the traffic-managing infrastructure represents geographic coordinates of the traffic-managing infrastructure associated with the token issuer.

* * * * *